US009069157B2

(12) United States Patent
Nagahara

(10) Patent No.: US 9,069,157 B2
(45) Date of Patent: Jun. 30, 2015

(54) PROJECTION ZOOM LENS AND PROJECTION APPARATUS

(71) Applicant: FUJIFILM Corporation, Tokyo (JP)

(72) Inventor: Akiko Nagahara, Saitama-ken (JP)

(73) Assignee: FUJIFILM CORPORATION, Tokyo (JP)

( * ) Notice: Subject to any disclaimer, the term of this patent is extended or adjusted under 35 U.S.C. 154(b) by 65 days.

(21) Appl. No.: 13/913,930

(22) Filed: Jun. 10, 2013

(65) Prior Publication Data

US 2013/0271848 A1 Oct. 17, 2013

Related U.S. Application Data

(63) Continuation of application No. PCT/JP2011/007008, filed on Dec. 15, 2011.

(30) Foreign Application Priority Data

Dec. 16, 2010 (JP) ................................. 2010-280520

(51) Int. Cl.
*G02B 15/14* (2006.01)
*G02B 13/16* (2006.01)
*G02B 15/173* (2006.01)
*G02B 15/28* (2006.01)

(52) U.S. Cl.
CPC ............... *G02B 15/14* (2013.01); *G02B 13/16* (2013.01); *G02B 15/173* (2013.01); *G02B 15/28* (2013.01)

(58) Field of Classification Search
CPC .... G02B 13/0045; G02B 13/12; G02B 15/24; G02B 13/14; G03B 21/00

USPC .................................. 359/682, 687, 695, 698
See application file for complete search history.

(56) References Cited

U.S. PATENT DOCUMENTS

| 4,380,377 | A | * | 4/1983 | Sato et al. ..................... 359/687 |
| 5,448,412 | A | | 9/1995 | Maruyama et al. |
| 7,298,560 | B2 | | 11/2007 | Hatakeyama |
| 7,742,231 | B2 | | 6/2010 | Ohtake et al. |
| 7,800,829 | B2 | | 9/2010 | Iwasawa |
| 2004/0190155 | A1 | | 9/2004 | Nagahara |
| 2006/0061874 | A1 | | 3/2006 | Hatakeyama |
| 2007/0291375 | A1 | | 12/2007 | Ohtake et al. |

(Continued)

FOREIGN PATENT DOCUMENTS

| JP | H06-109976 | 4/1994 |
| JP | 2003-241095 | 8/2003 |

(Continued)

OTHER PUBLICATIONS

Japanese Office Action, dated Jan. 13, 2015, in corresponding Japanese Patent Application No. 2012-548673.

*Primary Examiner* — Alicia M Harrington
(74) *Attorney, Agent, or Firm* — Young & Thompson

(57) ABSTRACT

Composing a projection zoom lens with a first lens group disposed on the most magnification side and having a positive power, the lens group being fixed at the time of zooming, a final lens group disposed on the most reduction side and having a negative power, the lens group being fixed at the time of zooming, and a plurality of lens groups disposed between the first and final lens groups and moved at the time of zooming along an optical axis in association with each other for the zooming and correction of image plane shift arising from the zooming, in which the final lens group includes a lens having a positive power on the most reduction side.

17 Claims, 18 Drawing Sheets

(56) References Cited

U.S. PATENT DOCUMENTS

| | | |
|---|---|---|
| 2008/0247053 A1 | 10/2008 | Iwasawa |
| 2009/0237805 A1* | 9/2009 | Fujihara .................. 359/687 |

FOREIGN PATENT DOCUMENTS

| | | |
|---|---|---|
| JP | 2004-077950 | 3/2004 |
| JP | 2004-240309 | 8/2004 |
| JP | 2004310083 | 11/2004 |
| JP | 2005-266173 | 9/2005 |
| JP | 2006-078704 | 3/2006 |
| JP | 2007-333805 | 12/2007 |
| JP | 2007-334051 | 12/2007 |
| JP | 2008-186026 | 8/2008 |
| JP | 4273556 | 6/2009 |
| JP | 2010054667 | 3/2010 |

* cited by examiner

FIG.12
EXAMPLE 2
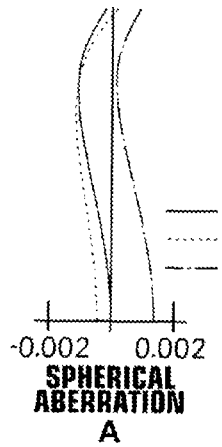
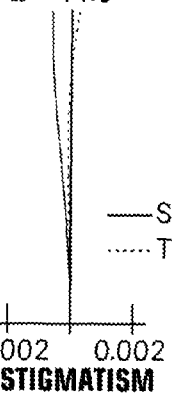
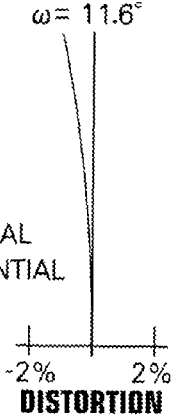
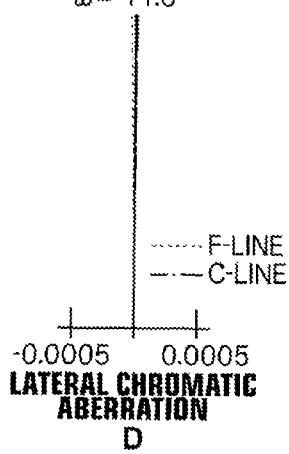
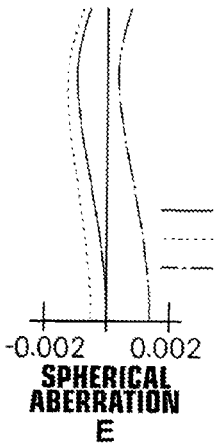
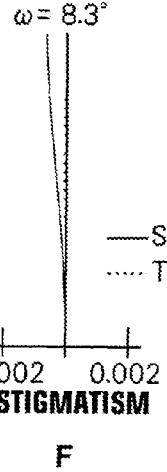
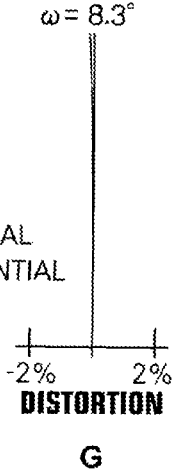
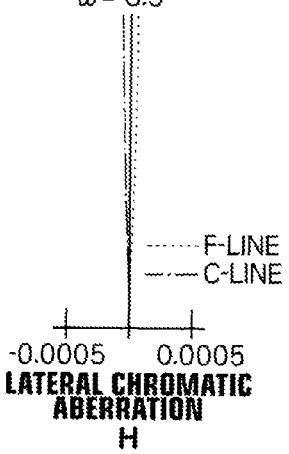
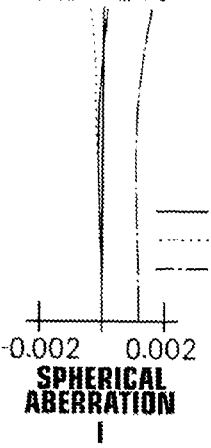
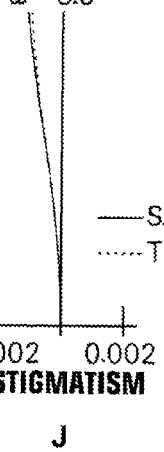
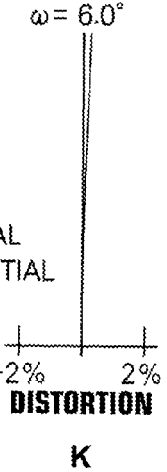
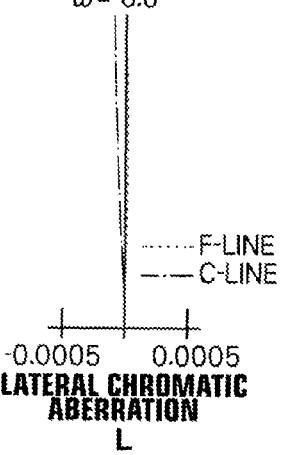

FIG.13

EXAMPLE 3

WIDE ANGLE END

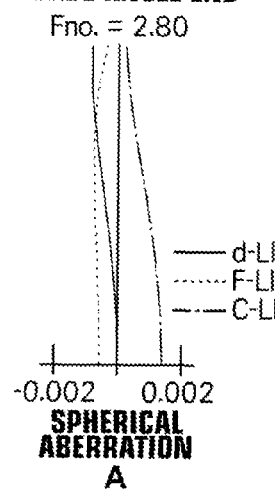
A — SPHERICAL ABERRATION (Fno. = 2.80; d-LINE, F-LINE, C-LINE)

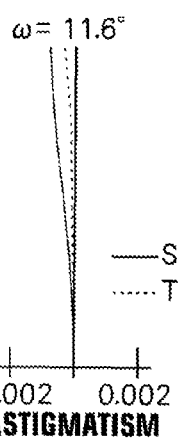
B — ASTIGMATISM (ω = 11.6°; SAGGITAL, TANGENTIAL)

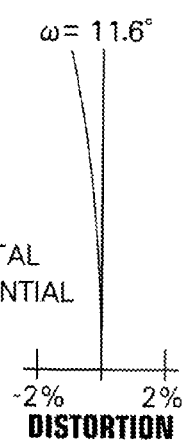
C — DISTORTION (ω = 11.6°)

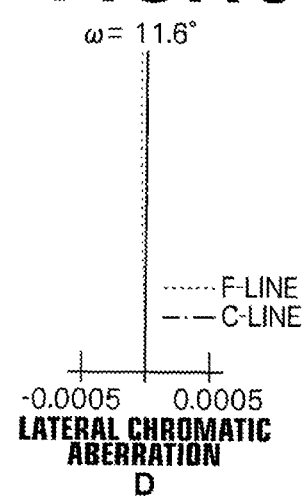
D — LATERAL CHROMATIC ABERRATION (ω = 11.6°; F-LINE, C-LINE)

MIDDLE OF ZOOMING

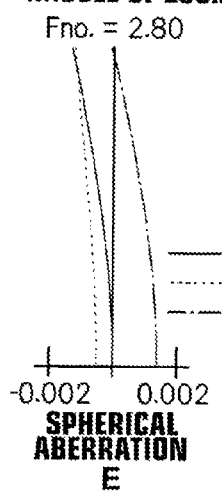
E — SPHERICAL ABERRATION (Fno. = 2.80; d-LINE, F-LINE, C-LINE)

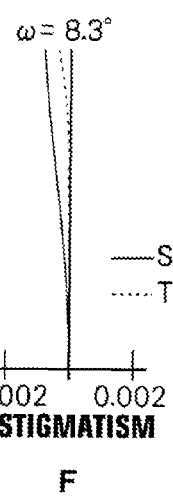
F — ASTIGMATISM (ω = 8.3°; SAGGITAL, TANGENTIAL)

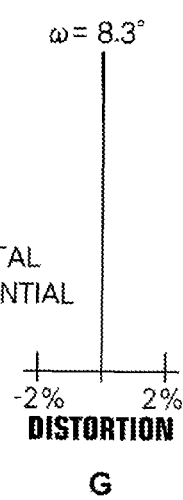
G — DISTORTION (ω = 8.3°)

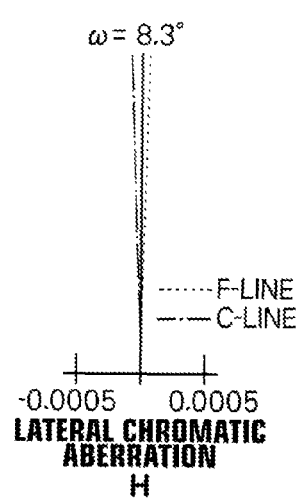
H — LATERAL CHROMATIC ABERRATION (ω = 8.3°; F-LINE, C-LINE)

TELEPHOTO END

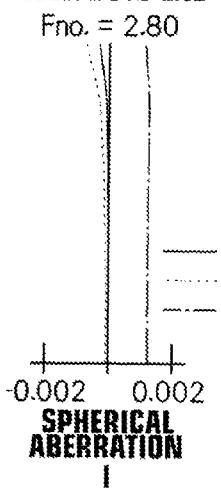
I — SPHERICAL ABERRATION (Fno. = 2.80; d-LINE, F-LINE, C-LINE)

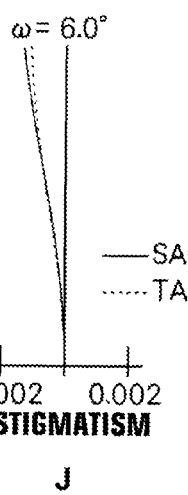
J — ASTIGMATISM (ω = 6.0°; SAGGITAL, TANGENTIAL)

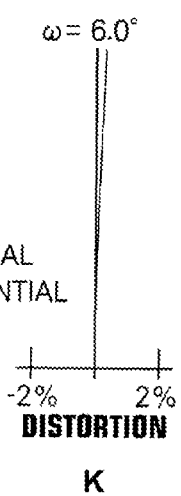
K — DISTORTION (ω = 6.0°)

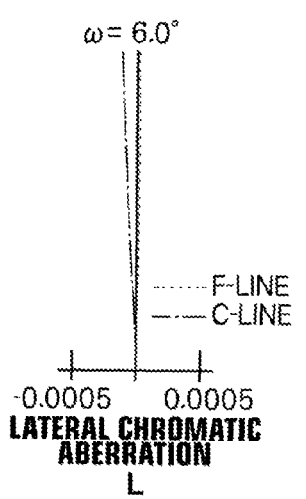
L — LATERAL CHROMATIC ABERRATION (ω = 6.0°; F-LINE, C-LINE)

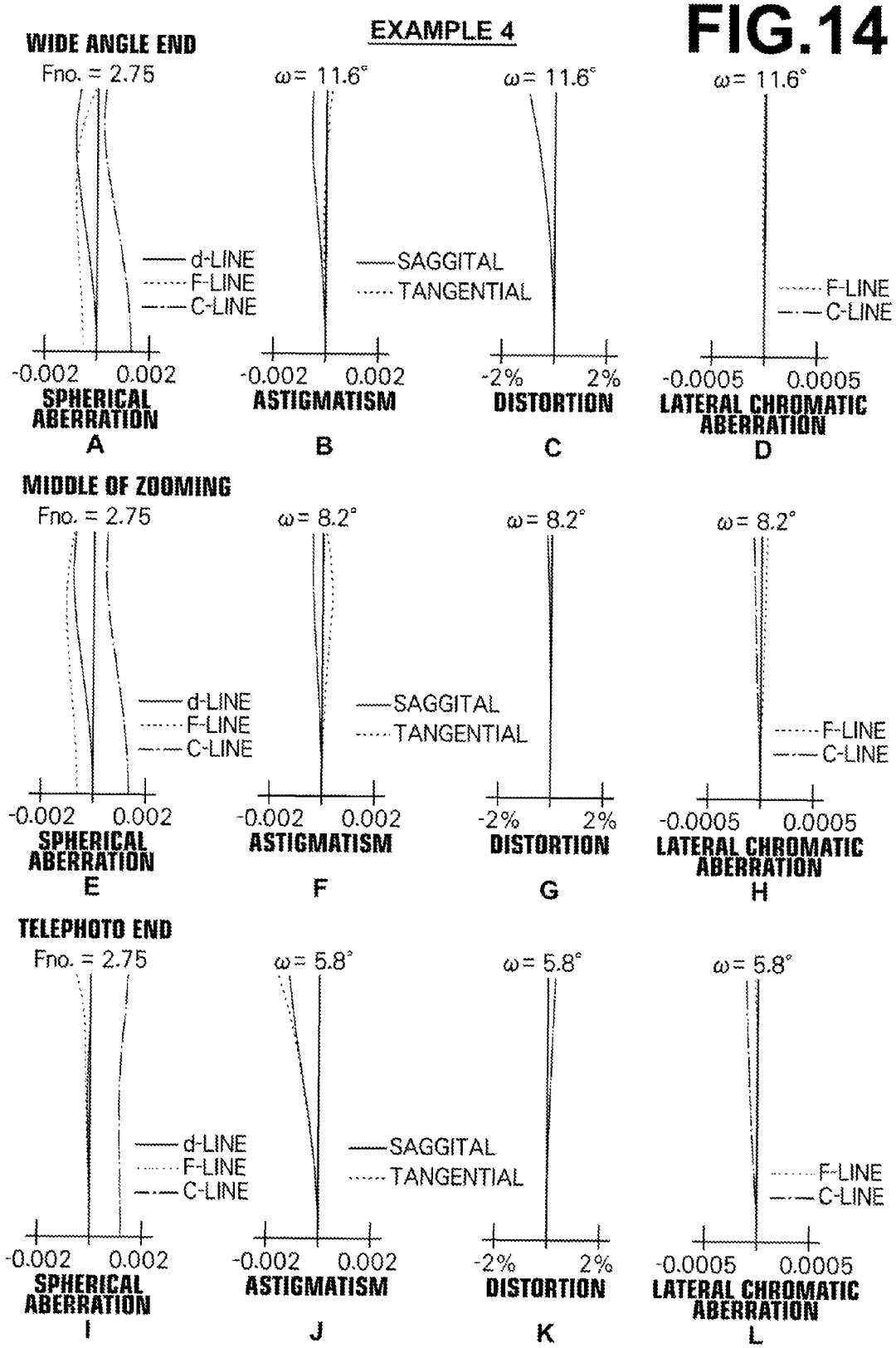

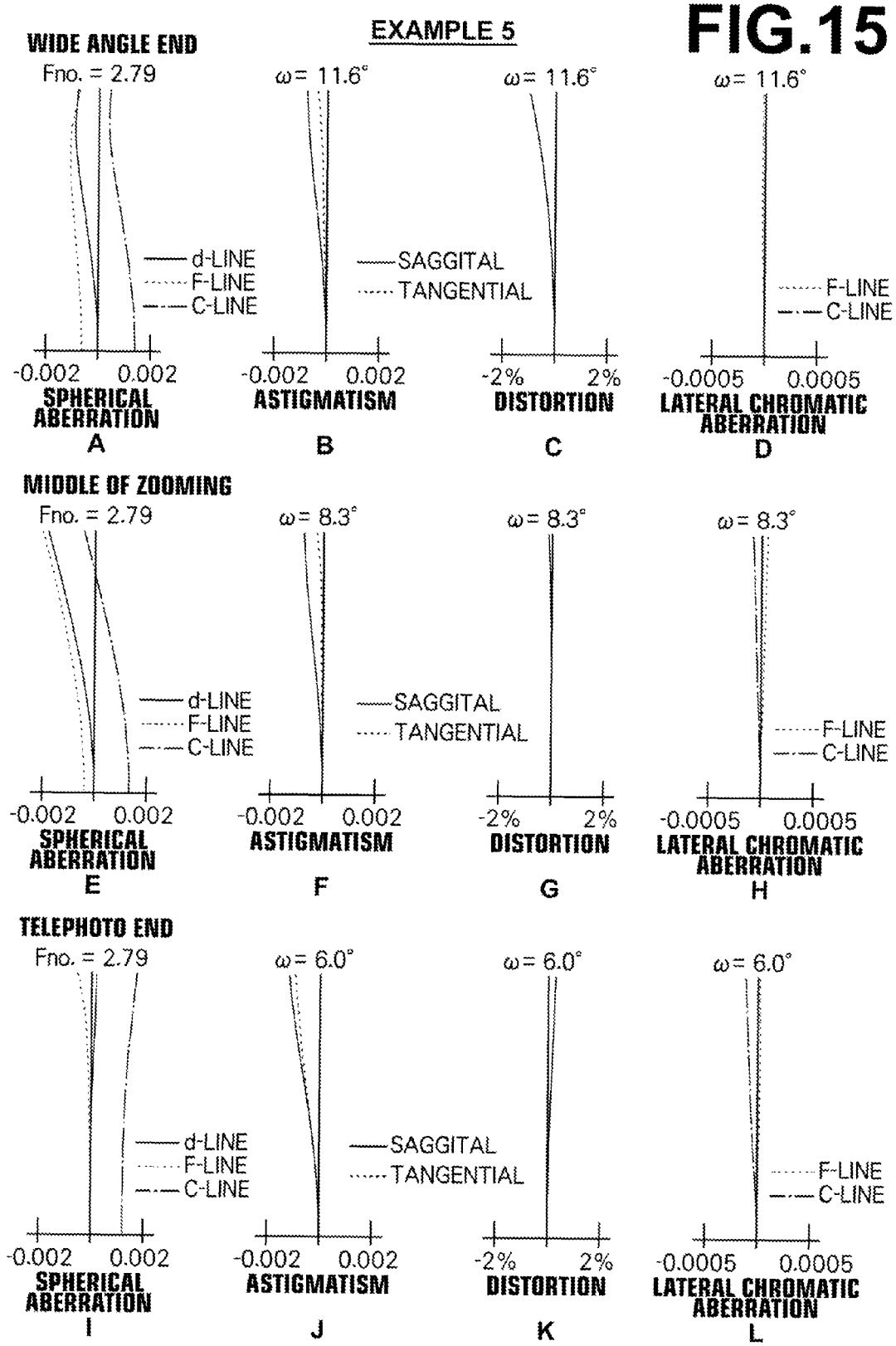

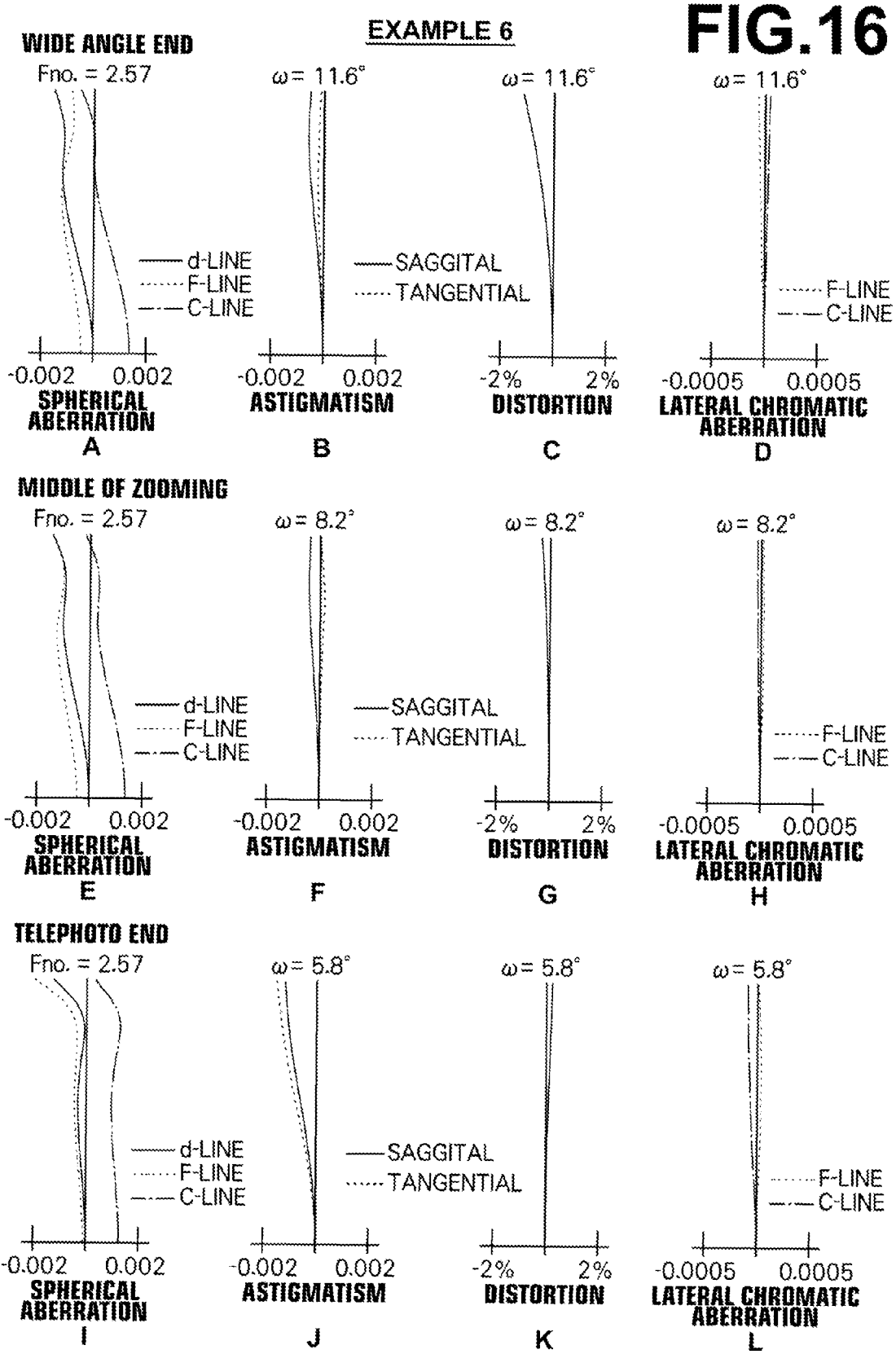

PROJECTION ZOOM LENS AND PROJECTION APPARATUS

BACKGROUND OF THE INVENTION

1. Field of the Invention

The present invention relates to a projection zoom lens installed in a projection apparatus and the projection apparatus, and more particularly to a projection zoom lens used in a projection apparatus having a light valve, such as a DMD (digital micro mirror device) or the like, and the projection apparatus.

2. Description of the Related Art

A light valve is used in a projection apparatus (hereinafter, also referred to as "projector") to perform light modulation for converting an image to a signal and a transmissive liquid crystal is known as one of the light valves.

A cross dichroic prism is generally used in an optical system in which a transmissive liquid crystal is used for color composition. In order to improve characteristics of color composition, a projection zoom lens used in the aforementioned optical system is telecentric on the reduction side.

Further, zoom lenses capable of changing image sizes are frequently used and the demand for zoom lenses having a high rate of changing, that is, a high zoom ratio has recently been increasing.

Japanese Unexamined Patent Publication No. 2008-186026 (Patent Document 1) is known as a document that discloses a projection zoom lens which is telecentric on the reduction side and has a high zoom ratio.

In the mean time, a projector having a DMD as the light valve is drawing wide attention with an increase in the demand for obtaining a projection image highly accurate and bright with a high contrast ratio.

A DMD includes a multitude of angle variable micro-mirrors and each pixel is switched from ON to OFF or vice versa by changing the angle of each micro-mirror and changing reflection directions of light emitted from the light source, whereby an entire projection image is formed.

In the case of a projection zoom lens using such DMD, known as a reflective light valve, the reduction side is not necessarily telecentric and the lens portion of the reduction side may be downsized.

Japanese Unexamined Patent Publication No. 2004-077950 (Patent Document 2), Japanese Unexamined Patent Publication No. 2004-240309 (Patent Document 3), and Japanese Unexamined Patent Publication No. 2007-333805 (Patent Document 4) are known as documents that disclose projection zoom lenses downsized in the lens portion of the reduction side as described above.

In the mean time, projectors used for business presentations or home theaters are generally required to be compact and wide angle as they are used in relatively small spaces and carried around without being installed permanently. In the case of an elongated space, however, the installation position of the projector is often fixed (permanently installed) at a place near the ceiling at the back and the projector is rather required to be telescopic in that case.

In the case where the installation position of a projector is changed every time the projector is used, a rough image size can be adjusted more easily as the projector has wider angle by changing the installation position rather than the zoom function. On the other hand, in the case where the installation position of a projector is fixed, the projection distance and image size are constrained, so that it is important for the zoom lens, to be a versatile lens, to have a high zoom ratio.

Further, in view of an application in which the projector is installed by suspending from the ceiling, it is important that the lens is downsized (lightweight) for reducing the weight of the entire projector The projection zoom lenses described in Patent Documents 2 to 4 have zoom ratios around 1.2 to 1.3 that do not meet the demand for a high zoom ratio, though downsized.

Zoom lenses described in U.S. Pat. No. 5,448,412 (Patent Document 5) and Japanese Patent No. 4273556 (Patent Document 6) have high zoom ratios, but the zoom lens described in Patent Document 5 has a problem that it has large spherical aberration and astigmatism so that it is not suitable for use with the projection lens intended by the invention of the present application.

The zoom lens described in Patent Document 6 has a problem that it has a short back focus. It may be possible, as a means, to proportionally expand the overall lens system in order to obtain a desired back focus and to use a portion of the effective image height. But, the proportional expansion of the overall lens system may result in increased aberrations, as well as extended lens itself. Therefore, it is difficult to realize a size allowable as a projection lens and performance.

SUMMARY OF THE INVENTION

In the mean time, for a projection zoom lens used in a projection apparatus having a DMD as described in Patent Documents 2 or 3, it is necessary to avoid entrance of ineffective light reflected when a micro-mirror of the DMD is oriented to the OFF side into the projection zoom lens and interference between a light source optical system for directing light to the DMD and a projection optical system for projecting light reflected from and modulated by the DMD. Consequently, it is necessary to satisfy both reduced diameters of lenses on the DMD side and a long back focus.

Generally, a longer back focus of a lens may result in a greater lens diameter on the reduction side. On the other hand, in order to obtain satisfactory imaging performance, a combination of many lenses is required, thereby resulting in an increased overall length and increased lens diameter on the magnification side. This causes a problem that it is difficult to downsize the lens.

Further, it is necessary to reduce the variation in F-number of a projection zoom lens arising from zooming of the lens over the entire zoom range in order to maintain the brightness of projection images of the same screen size substantially constant. This requires that the variation in the pupil position of the projection zoom lens on the reduction side arising from the zooming is reduced.

Currently, the variable angle of micro-mirrors of a DMD is about ±12° and the brightness of the projection zoom lens is up to about F2.4 in order not to make the optical path of the effective light flux of ON side overlap with the optical path of the ineffective light flux of OFF side. If the brightness becomes excessive dark from that value, it is difficult to achieve the goal of providing a high-brightness projector. Thus, the brightness of the projection zoom lens is required to be higher than F3.0 over the entire zoom range.

The present invention has been developed in view of the circumstances described above, and it is an object of the present invention to provide a projection zoom lens considered in overall downsizing with increased zoom ratio and sufficient brightness over the entire zoom range while aberrations are satisfactorily corrected. It is a further object of the present invention to prove a projection apparatus having the projection zoom lens described above.

A projection zoom lens of the present invention is a projection zoom lens, substantially consisting of:

a first lens group disposed on the most magnification side and having a positive power, the lens group being fixed at the time of zooming;

a final lens group disposed on the most reduction side and having a negative power, the lens group being fixed at the time of zooming; and a plurality of lens groups disposed between the first and final lens groups and moved at the time of zooming along an optical axis in association with each other for the zooming and correction of image plane shift arising from the zooming, wherein the final lens group comprises a lens having a positive power on the most reduction side.

Preferably, the aforementioned projection zoom lens satisfies a conditional expression (1): $3.0 < Bf/Ymax < 4.0$, where Bf is a back focus (air equivalent distance), and Ymax is a maximum image height on the reduction side.

It is more preferable that the projection zoom lens satisfies a conditional expression (1A): $3.2 < Bf/Ymax < 3.5$.

Preferably the aforementioned projection zoom lens satisfies a conditional expression (2): $3.0 < EP/Ymax < 7.0$, where, EP is a distance from a pupil position on the reduction side to an image forming position on the reduction side at the wide angle end; and Ymax is a maximum image height on the reduction side.

It is more preferable that the projection zoom lens satisfies a conditional expression (2A): $4.0 < EP/Ymax < 5.5$.

The plurality of lens groups may be composed of a second lens group having a negative power, a third lens group having a positive power, and a fourth lens group having a positive power arranged in this order from the magnification side.

The second and third lens groups may be configured to be moved from the magnification side to the reduction side when zooming is performed from the wide angle end to the telephoto end, and the fourth lens group may be configured to be moved once to the magnification side and then to the reduction side when zooming is performed from the wide angle end to the telephoto end.

Preferably, the pupil position on the reduction side at the wide angle end is further to the reduction side than a lens surface disposed on the most reduction side in the plurality of lens groups moved at the time of zooming.

Preferably, the aforementioned projection zoom lens satisfies a conditional expression (3): $0.1 < f4/f < 2.0$, where f is a focal length of the overall lens system at the wide angle end, and f4 is a focal length of the fourth lens group.

It is more preferable that the projection zoom lens satisfies a conditional expression (3A): $0.4 < f4/f < 1.5$.

Preferably, the aforementioned projection zoom lens satisfies a conditional expression (4): $0.5 < (f45)/f < 1.5$, where f is a focal length of the overall lens system at the wide angle end, and f45 is a combined focal length of the fourth and fifth lens groups.

It is more preferable that the projection zoom lens satisfies a conditional expression (4A): $0.8 < (f45)/f < 1.2$.

The aforementioned projection zoom lens may perform focusing by moving the first lens group in an optical axis direction.

The aforementioned projection zoom lens may be configured to have an F-number which is constant over the entire range of the zooming.

The final lens group maybe configured without using a cemented lens.

Preferably, the aforementioned projection zoom lens has a zoom ratio of not less than 1.5 and more preferably not less than 1.7.

Preferably, the aforementioned projection zoom lens has a half angle of view of not greater than 15° on the magnification side at a maximum image height on the reduction side at the telephoto end.

The aforementioned projection zoom lens may be composed of only spherical lenses.

The aforementioned projection zoom lens may be a projection zoom lens that performs the zooming continuously or discontinuously.

A projection apparatus of the present invention includes the aforementioned projection zoom lens, a light source, and a light valve for modulating a light flux emitted from the light source, wherein the light flux emitted from the light source and modulated by the light valve is projected through the projection zoom lens.

According to the projection zoom lens of the present invention and a projection apparatus using the same, downsizing of the overall projection zoom lens is considered with increased zoom ratio and sufficient brightness over the entire zoom range while aberrations are satisfactorily corrected.

That is, the final lens group is fixed at the time of zooming and the lens disposed on the most reduction side in the final lens group is positive so that the diameter of a light flux, even if it is bright, passing through the final lens group may be reduced.

Further, as the final lens group has a negative power, a greater positive power can be allocated to a lens group disposed on the magnification side of the final lens group. This allows the overall length of the zoom lens to be kept short even if the zoom ratio is increased and the outer diameter of a lens group on the magnification side to be reduced.

Still further, as the first lens group has a positive power, a high zoom ratio may be obtained in a lens system having a relatively small angle of view.

This allows a projection zoom lens overall downsized with increased zoom ratio and sufficient brightness while aberrations are satisfactorily corrected to be realized.

BRIEF DESCRIPTION OF THE DRAWINGS

FIG. 12 illustrates various types of aberrations of the projection zoom lens of Example 2.

FIG. 13 illustrates various types of aberrations of the projection zoom lens of Example 3.

FIG. 14 illustrates various types of aberrations of the projection zoom lens of Example 4.

FIG. 15 illustrates various types of aberrations of the projection zoom lens of Example 5.

FIG. 16 illustrates various types of aberrations of the projection zoom lens of Example 6.

DESCRIPTION OF THE PREFERRED EMBODIMENTS

Hereinafter, an embodiment of the present invention will be described with reference to the accompanying drawings.

Figure 1:
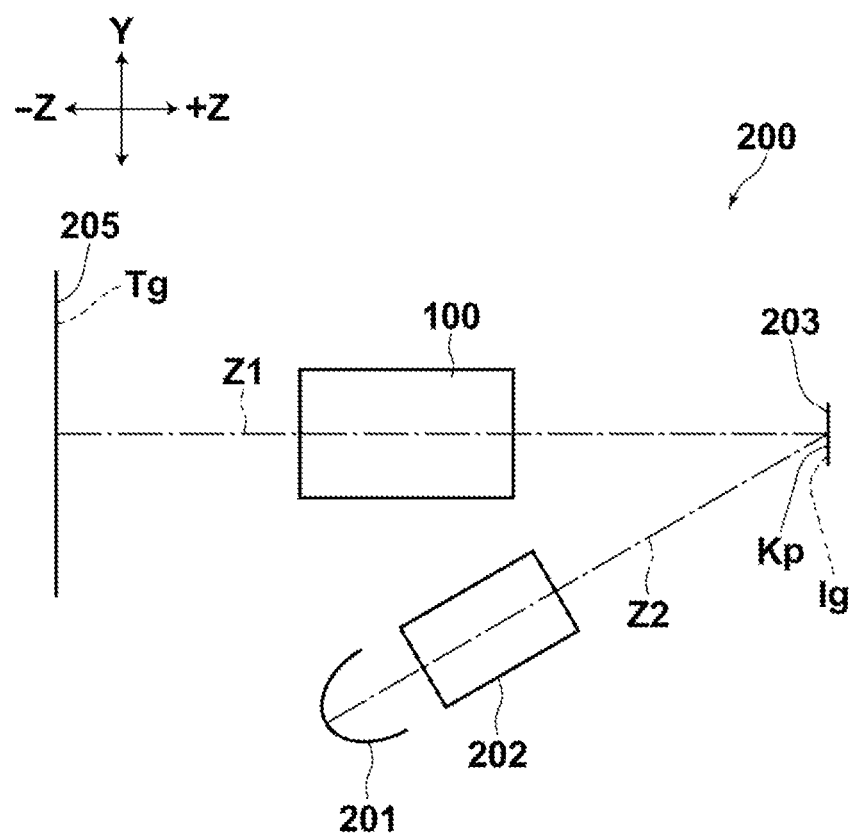
FIG. 1 is a conceptual diagram of a projection apparatus according to an embodiment of the present invention, illustrating a schematic configuration thereof.

FIG. 1 is a conceptual diagram of a projection apparatus having a projection zoom lens of the present invention, illustrating a schematic configuration thereof.

As illustrated, a projection apparatus 200 includes a light source 201, an illumination optical system 202, a DMD 203, and a projection zoom lens 100.

A light flux emitted from the light source 201 enters into the illumination optical system 202. In the illumination optical system 202, each light flux of three primary colors (R, G, B) is sequentially extracted from the light flux entered therein by a color wheel (not shown) and light intensity distribution thereof at a cross-section orthogonal to an optical axis Z2 of the illumination optical system 202 is homogenized. Then the homogenized light flux is outputted from the illumination optical system 202 and directed to the DMD 203. At the DMD 203, the light flux of each color is spatially modulated according to switching of the colors and projected onto a screen 205 through the projection zoom lens 100 of the present embodiment.

The projection apparatus 200 projects a projection image Tg representing an original image Ig formed on an image forming surface Kp of the DMD 203 onto the screen 205 through the projection zoom lens 100.

It is noted that the projection apparatus shown in FIG. 1 illustrates one embodiment of the present invention and various modifications may be made.

Figure 2:
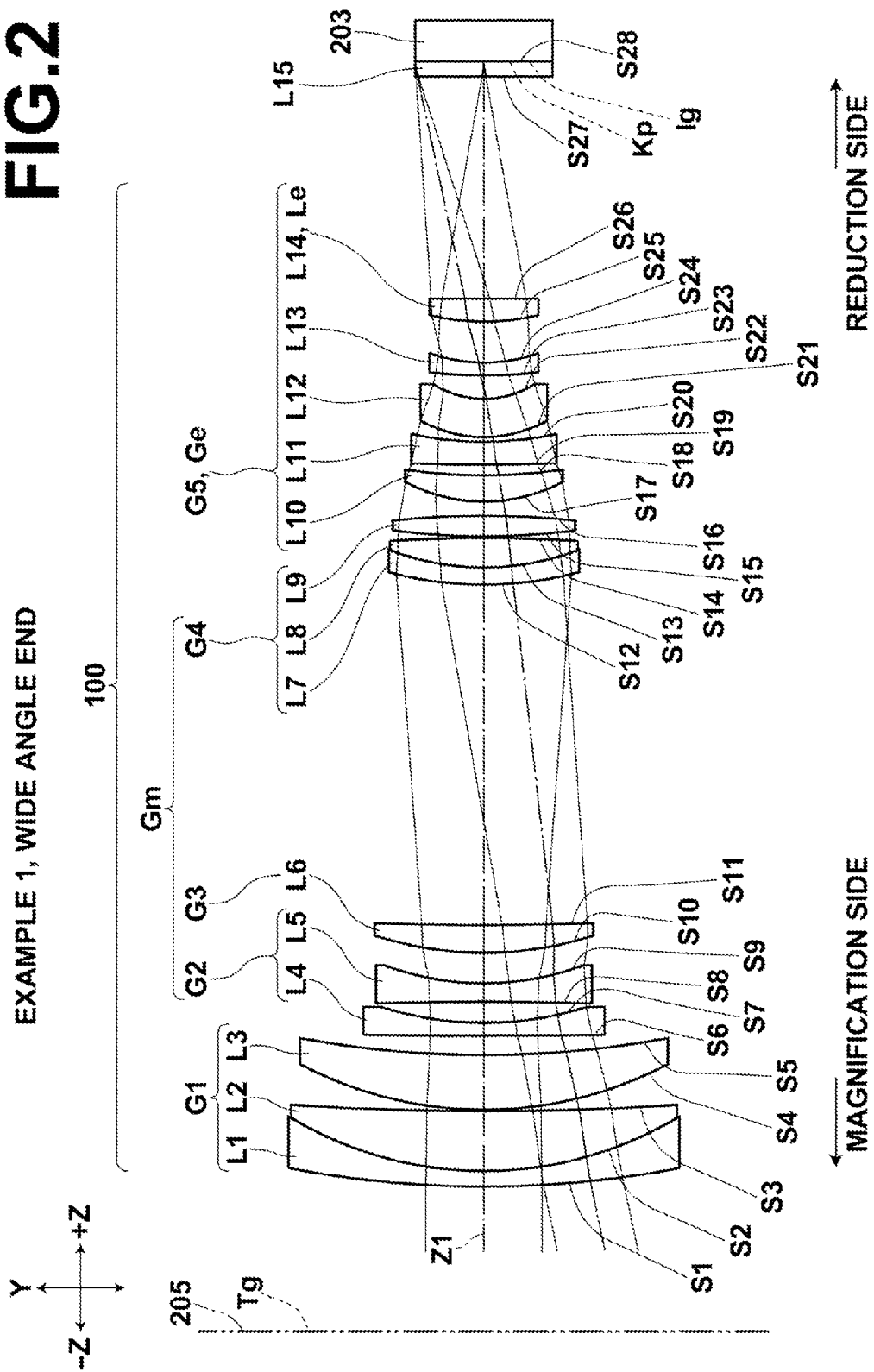
FIG. 2 is a cross-sectional view of a projection zoom lens of Example 1, illustrating a lens arrangement at the wide angle end.
Figure 3:
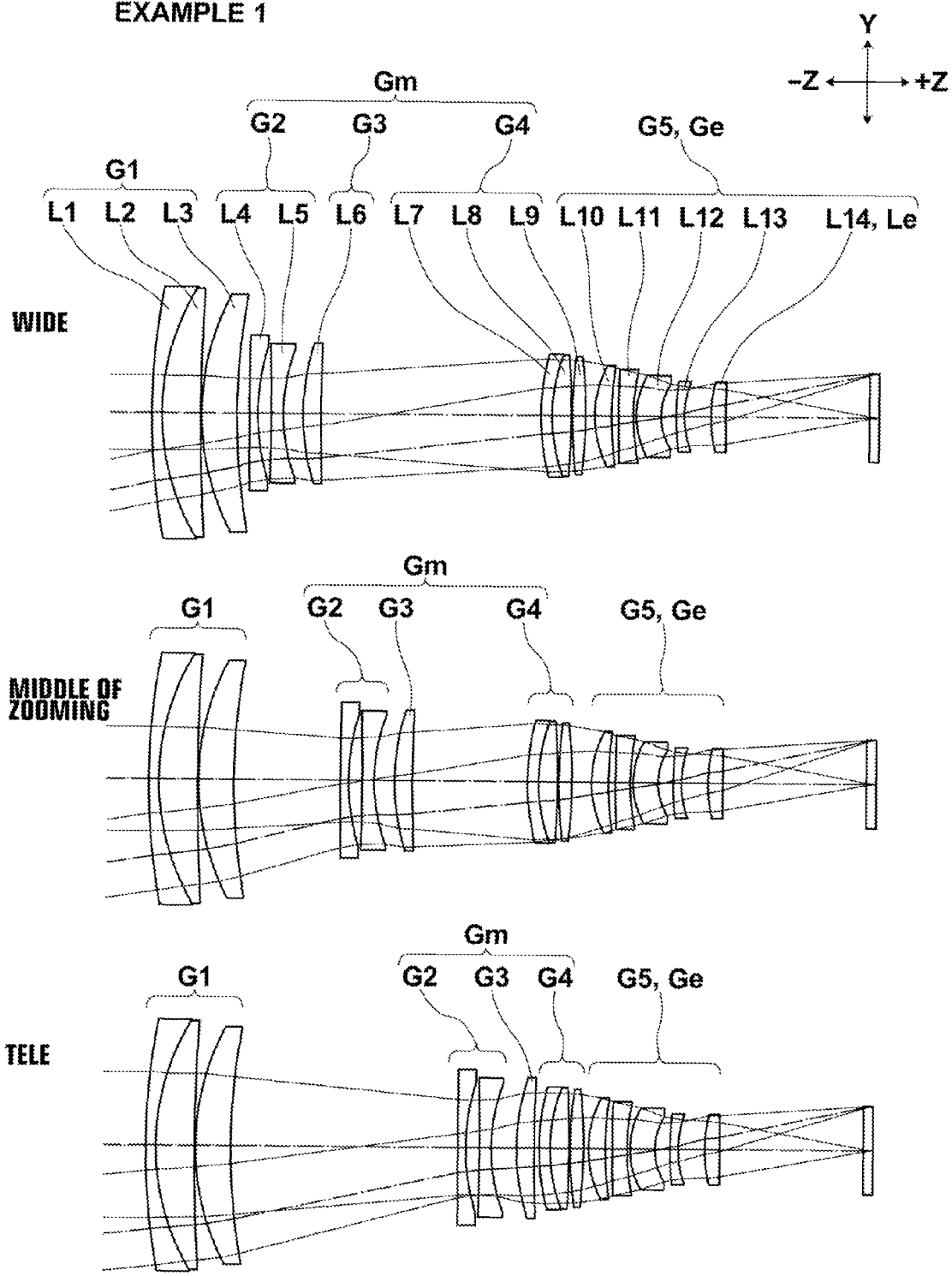
FIG. 3 shows cross-sectional views of the projection zoom lens of Example 1, illustrating lens arrangements at the wide angle end, in the middle of zooming, and at the telephoto end respectively.

FIG. 2 is a cross-sectional view of a projection zoom lens of Example 1 according to the present invention, illustrating a lens arrangement at the wide angle end, and FIG. 3 shows cross-sectional views of the projection zoom lens of Example 1, illustrating lens arrangements at the wide angle end, in the middle of zooming, and at the telephoto end respectively.

Hereinafter, an embodiment of the projection zoom lens of the present invention will be described in detail using this lens as the representative example.

Each of the symbols S1 to S26 represents $i^{th}$ lens surface (i=1, 2, 3, . . . ) of the zoom lens 100 which is sequentially increased from the most magnification side to reduction side. Surfaces of a cover glass L15 on the magnification side and on the reduction side correspond to the symbols S27 and S28 respectively.

Each of the symbols L1, L2, . . . , L14 in FIG. 2 represents $j^{th}$ (j=1, 2, 3, . . . ) lens of the projection zoom lens which is sequentially increased from the most magnification side to reduction side.

Further, each of symbols G1 to G5 in FIG. 2 represents $k^{th}$ (k=1, 2, 3, 4, 5) lens group of the projection zoom lens which is sequentially increased from the most magnification side to reduction side.

The zoom lens 100 includes a first lens group G1 disposed on the most magnification side (arrow −Z direction in the drawing) and having a positive power, which is fixed at the time of zooming, a final lens group Ge disposed on the most reduction side (arrow +Z direction in the drawing) and having a negative power, which is fixed at the time of zooming, and a plurality of lens groups Gm disposed between the first and final lens groups and moved at the time of zooming. Here, the plurality of lens groups Gm includes lens group G2, lens group G3, and lens group G4, but not necessarily limited to the three lens groups.

The final lens Le disposed on the most reduction side in the final lens group Ge has a positive power. Here, the final lens group Ge corresponds to the lens group G5 in the drawing.

Although zooming is performed continuously in the present embodiment, the zooming may be performed discontinuously to change the zoom ratio to, for example, 1.1, 1.2, 1.3, and so on.

The plurality of lens groups Gm is moved in association with each other. The associated movement of the plurality of lens groups Gm causes zooming and correction to prevent a positional shift of the projection image Tg projected through the zoom lens 100 at the time of the zooming.

Next, structural requirements that further limit the basic structure, operation and effects thereof will be described. Note that the structural requirements that further limit the basic structure are not essential for the zoom lens of the present invention. The zoom lens of the present invention may satisfy one of the structural requirements that further limit the basic structure or a combination of two or more requirements.

First, a meaning of each parameter represented by a symbol in conditional expressions (1) to (4) will be listed below.

Bf: a back focus (air equivalent distance);
Ymax: a maximum image height on the reduction side;
EP: a distance from the pupil position on the reduction side to the image forming position on the reduction side at the wide angle end;
f: a focal length of the overall lens system at the wide angle end;
f4: a focal length of the fourth lens group G4; and
f45: a combined focal length of the fourth lens group G4 and fifth lens group G5.

The "image forming position on the reduction side" described above corresponds to the position of the image forming surface Kp of EMD 203 in FIG. 2 which is in conjugate relationship with a position of the projection image Tg projected onto the magnification side through the zoom lens 100.

The back focus Bf is a distance from a lens surface disposed on the most reduction side among those constituting the zoom lens 100 to the "image forming position on the reduction side of the projection zoom lens" on the optical axis Z1 obtained by air-converting the thickness of the cover glass L15.

The maximum image height (Ymax) on the reduction side described above is a distance from a position farthest from the optical axis Z1 to the optical axis Z1 on the image forming surface Kp.

The "distance from the pupil position on the reduction side to the image forming position on the reduction side at the wide angle end (EP)" is a distance from the pupil position on the reduction side at the wide angle end to the "image forming position of the projection zoom lens on the reduction side".

Note that the pupil position on the reduction side at the wide angle end is in the fifth lens group G5 in the present embodiment.

A conditional expression (1): 3.0<Bf/Ymax<4.0 defines the relationship between the back focus (Bf) and the maximum image height (Ymax) on the reduction side.

As the present example is configured to satisfy the conditional expression (1), ineffective light reflected when a micromirror disposed on the image forming surface Kp is oriented to OFF side is prevented from entering into the zoom lens 100, and the light source and illumination optical system can be arranged appropriately.

If the zoom lens is configured to exceed the upper limit of the conditional expression (1), the outer diameter of the final lens group Ge is increased, while if it is configured to fall below the lower limit of the conditional expression (1), the back focus is reduced, thereby causing difficulty in avoiding interference between the zoom lens, illumination optical system, and their optical paths.

A conditional expression (2): 3.0<EP/Ymax<7.0 defines the relationship between distance from the pupil position on the reduction side to the image forming position on the reduction side at the wide angle end (EP) and the maximum image height on the reduction side (Ymax).

As the present example is configured to satisfy the conditional expression (2), the outer lens diameter can be limited to a desired size.

If the zoom lens is configured to exceed the upper limit of the conditional expression (2), there arises a problem that the outer diameter of the final lens group Ge is increased.

Contrary to this, if the zoom lens is configured to fall below the lower limit of the conditional expression (2), there arises a problem that the outer diameters of the lens groups disposed on the magnification side of the final lens group Ge are increased.

The present example includes, as the plurality of lens groups Gm, a second lens group G2 having a negative power, a third lens group G3 having a positive power, and a fourth lens group G4 having a positive power arranged in this order from the magnification side.

The second lens group G2 and third lens group G3 are lens groups moved from the magnification side to the reduction side when zooming is performed from the wide angle end to the telephoto end, and the fourth lens group G4 is a lens group moved once to the magnification side and then to the reduction side when zooming is performed from the wide angle end to the telephoto end. The configuration of a moving lens group that largely contributes to zooming with two lens groups of the second lens group G2 having a negative power and the third lens group G3 having a positive power as described above allows, in particular, field curvature to be corrected satisfactorily over the entire zoom range, while the movement of the fourth lens G4 that largely contribute to the correction of image plane shift arising from zooming in the manner described above may result in satisfactory correction of image plane shift.

Further, focusing is performed by moving the first lens group G1 to optical axis directions in the present example. The use of the lens group which is fixed at the time of zooming for focusing allows the structure to be simplified.

Still further, in the present example, the pupil position on the reduction side at the wide angle end is on more reduction side than a lens surface disposed on the most reduction side in the plurality of lens groups Gm. This arrangement allows the aperture stop to be easily placed at a position on the reduction side of the plurality of lens groups Gm, whereby variation in F-number arising from zooming can be minimized. In the present example, the pupil position on the reduction side is in the fifth lens group G5 over the entire zoom range so that the F-number remains constant and the brightness of projection images of the same screen size can be maintained constant over the entire zoom range.

Preferably, a cemented lens is not used in the final lens group as in the present example in order to avoid optical performance degradation due to deterioration of bonding material or the like, because light flux concentration occurs adjacent to the aperture stop.

A conditional expression (3): 0.1<f4/f<2.0 defines the relationship between the focal length of the overall lens system (f) and the focal length of the fourth lens group G4.

As the present example is configured to satisfy the conditional expression (3), a sufficient back focus is secured while the outer lens diameter is prevented from becoming too large.

If the zoom lens is configured to exceed the upper limit of the conditional expression (3), there arises a problem that the outer diameters of the lens groups disposed on the magnification side of the fourth lens group G4 are increased.

Contrary to this, if the zoom lens is configured to fall below the lower limit of the conditional expression (3), there arises a problem that it is difficult to ensure a sufficient back focus.

A conditional expression (4): 0.5<(f45)/f<1.5 defines the relationship between the focal length of the overall lens system (f) and the combined focal length of the fourth lens group G4 and fifth lens group G5.

As the present example is configured to satisfy the conditional expression (4), a sufficient back focus is secured while the overall length is prevented from becoming too long.

If the zoom lens is configured to exceed the upper limit of the conditional expression (4), the movement of the second lens group G2 and third lens group G3 becomes excessive at the time of zooming, thereby causing a problem that the overall length is increased.

Contrary to this, if the zoom lens is configured to fall below the lower limit of the conditional expression (4), there arises a problem that it is difficult to ensure a sufficient back focus.

The projection zoom lens of the present invention has a zoom ratio of not less than 1.5 to meet the demand of high zoom ratio, but it is more preferable that the projection zoom lens is configured to have a zoom ratio of not less than 1.7.

Further, the projection zoom lens of the present invention has a half angle of view of not greater than 15° on the magnification side at a maximum image height on the reduction side at the telephoto end and is also suitable for telephoto application, but it is more preferable that the half angle of view is not greater than 10°.

The present example is composed of only spherical lenses without using any aspherical lens which requires a high manufacturing cost.

It is more preferable that the projection zoom lens of the present invention satisfies a conditional expression (1A):

3.2<Bf/Ymax<3.5, a conditional expression (2A): 4.0<EP/Ymax<5.5, a conditional expression (3A):0.4<f4/f<1.5, and a conditional expression (4A): 0.8<(f45)/f<1.2 instead of the conditional expressions (1), (2), (3), and (4) respectively. This allows more significant effects than those when the conditional expressions (1), (2), (3), and (4) are satisfied to be obtained.

SPECIFIC EXAMPLES

Hereinafter, numerical data and the like of Examples 1 to 8 of the zoom lens according to the present invention will be described with reference to FIGS. 3 to 17 and Tables 1 to 9.

FIGS. 3 to 10 are cross-sectional views of zoom lenses of Examples 1 to 8 respectively, each comparatively illustrating the state of lenses at the wide angle end, in the middle of zooming, and at the telephoto end from top to bottom.

More specifically, the projection zoom lens of Example 1 is configured as illustrated in FIG. 3. It includes a first lens group G1 having a positive power, a second lens group G2 having a negative power, a third lens group G3 having a positive power, a fourth lens group G4 having a positive power, and a fifth lens group G5 (final lens group Ge) having a negative power arranged in this order from the magnification side. When zooming is performed from the wide angle end to the telephoto end, the second lens group G2 and third lens group G3 are moved from the magnification side to the reduction side, while the fourth lens group G4 is moved once to the magnification side and then to the reduction side. In this way, the projection zoom lens of Example 1 performs zooming and corrects image plane shift arising from the zooming.

The first lens group G1 includes a negative meniscus lens (first lens L1), a positive meniscus lens (second lens L2), and a positive meniscus lens (third lens L3) arranged in this order from the magnification side, in which the first lens L1 and second lens L2 are cemented to form a cemented lens.

Note that a positive lens refers to a lens having a positive power and a negative lens refers to a lens having a negative power.

The second lens group G2 includes a negative meniscus lens (fourth lens L4) and a biconcave lens (fifth lens L5) arranged in this order from the magnification side.

The third lens group G3 includes a positive meniscus lens (sixth lens L6).

The fourth lens group G4 includes a negative meniscus lens (seventh lens L7), a biconvex lens (eighth lens L8), and a biconvex lens (ninth lens L9) arranged in this order from the magnification side, in which the seventh lens L7 and eighth lens L8 are cemented to form a cemented lens.

The fifth lens G5 includes a positive meniscus lens (tenth lens L10), a negative meniscus lens (eleventh lens L11), a negative meniscus lens (twelfth lens L12), a negative meniscus lens (thirteenth lens L13), and a plano-convex lens (fourteenth lens L14 (final lens Le)) arranged in this order from the magnification side.

Figure 4:
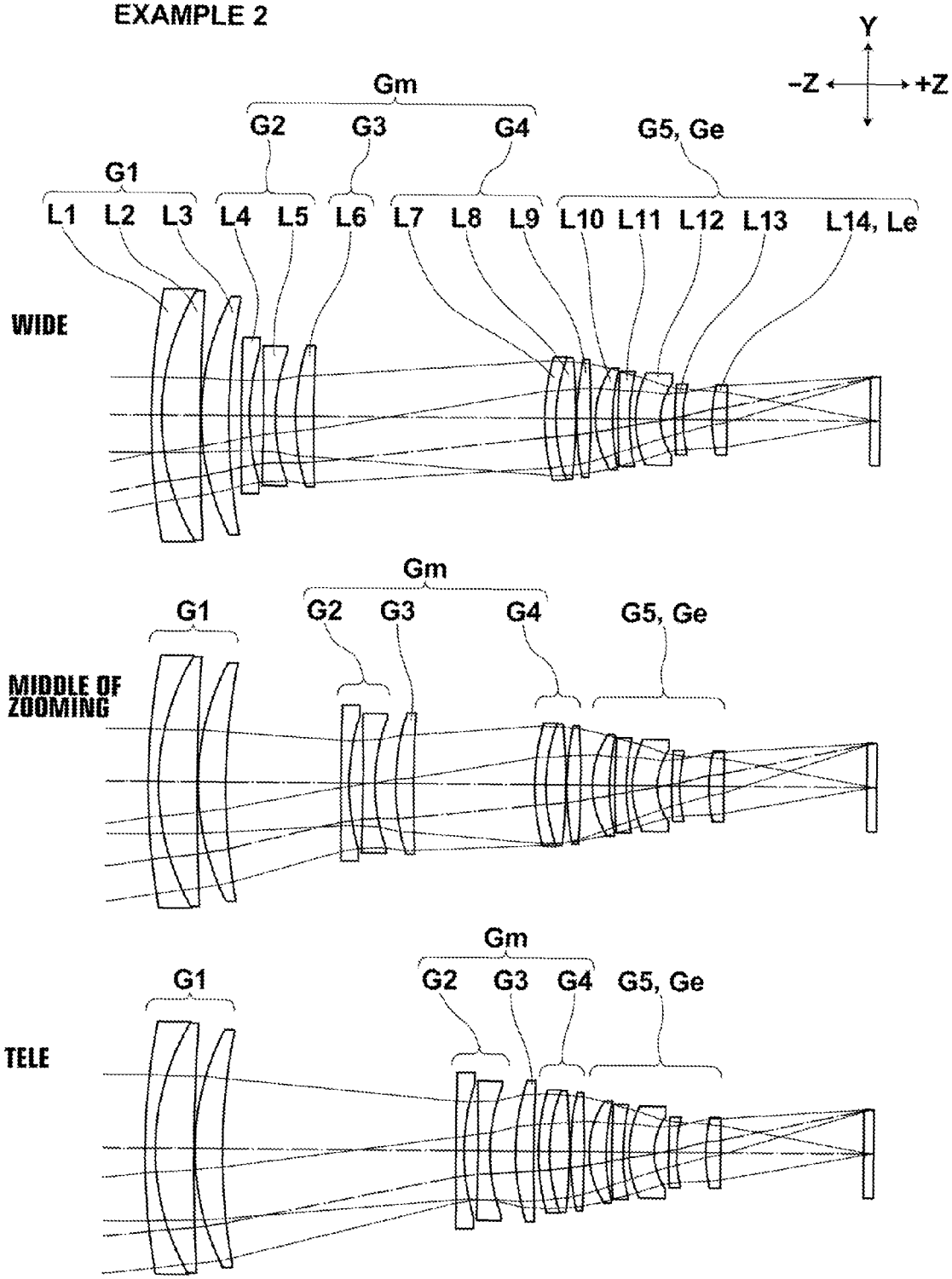
FIG. 4 shows cross-sectional views of a projection zoom lens of Example 2, illustrating lens arrangements at the wide angle end, in the middle of zooming, and at the telephoto end respectively.

The projection zoom lens of Example 2 is configured as illustrated in FIG. 4 which is similar to that of Example 1 but differs in that the fourteenth lens L14 included in the fifth lens group G5 is a biconvex lens.

Figure 5:
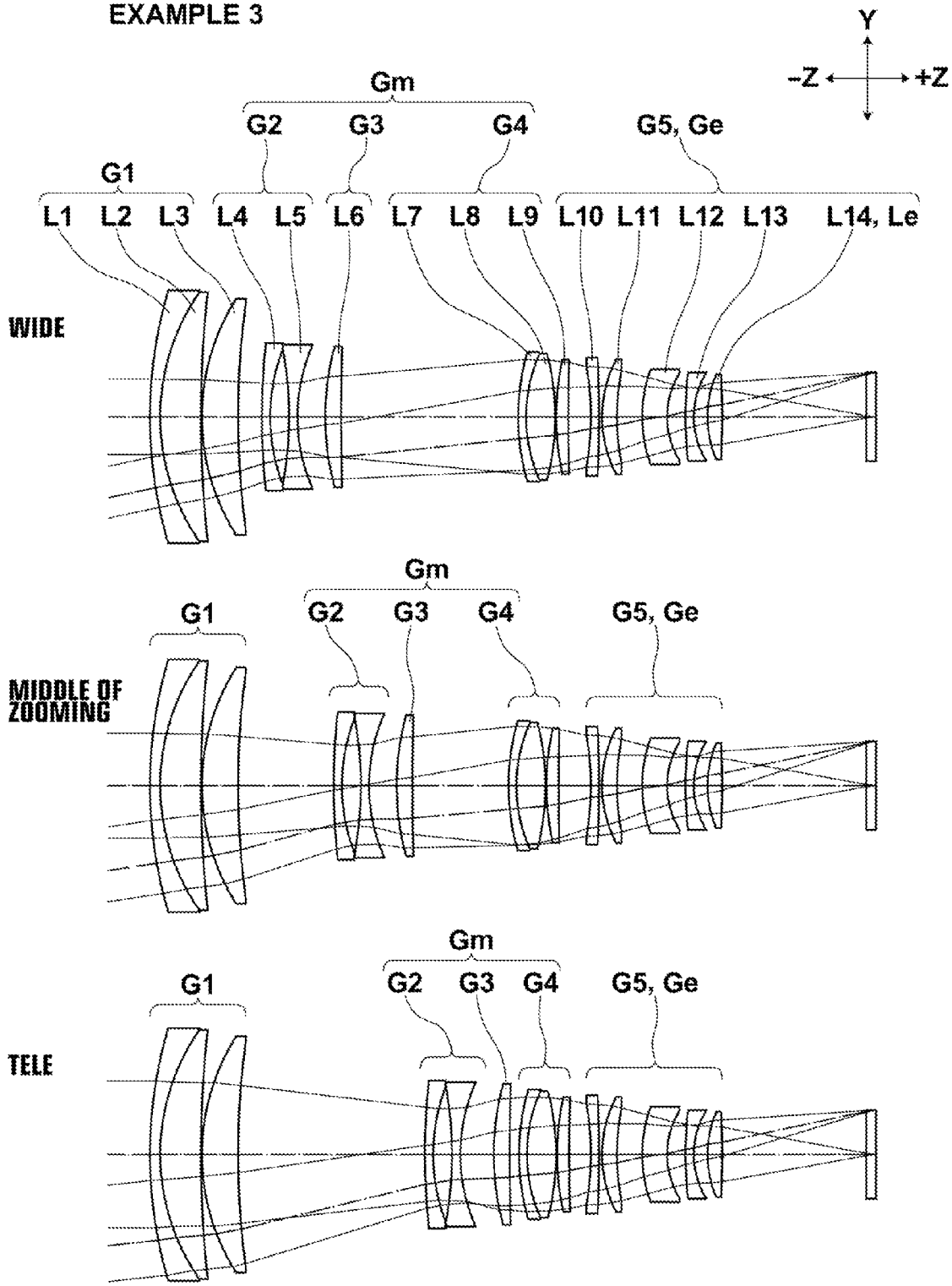
FIG. 5 shows cross-sectional views of a projection zoom lens of Example 3, illustrating lens arrangements at the wide angle end, in the middle of zooming, and at the telephoto end respectively.

The projection zoom lens of Example 3 is configured as illustrated in FIG. 5 which is similar to that of Example 1 but differs in that the ninth lens L9 included in the fourth lens group G4 is a positive meniscus lens, the tenth lens L10 included in the fifth lens group G5 is a negative meniscus lens, the eleventh lens L11 included in the fifth lens group G5 is a positive meniscus lens, and the fourteenth lens L14 included in the fifth lens group G5 is a biconvex lens.

Figure 6:
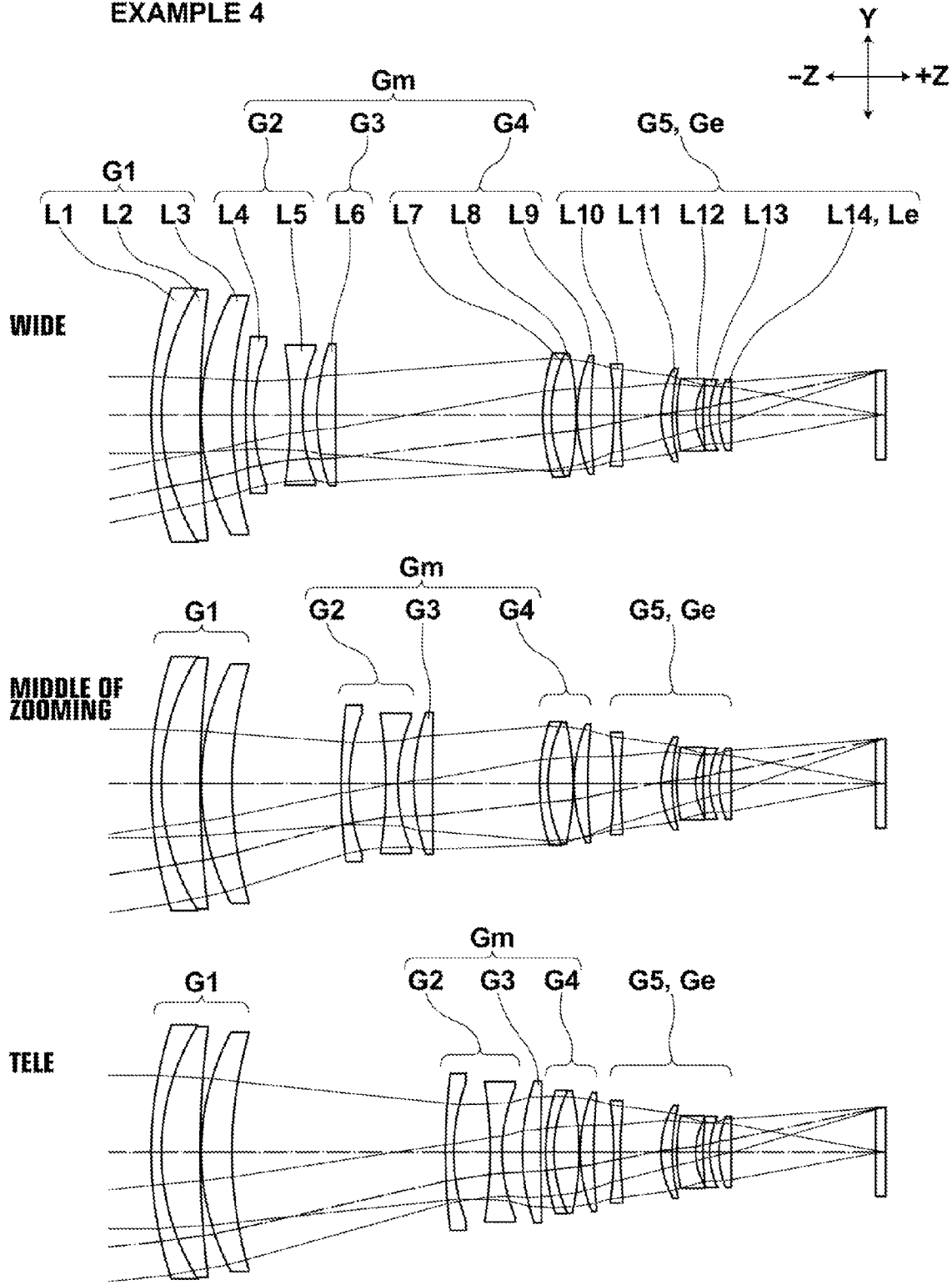
FIG. 6 shows cross-sectional views of a projection zoom lens of Example 4, illustrating lens arrangements at the wide angle end, in the middle of zooming, and at the telephoto end respectively.

The projection zoom lens of Example 4 is configured as illustrated in FIG. 6 which is similar to that of Example 1 but differs in that the ninth lens L9 included in the fourth lens group G4 is a positive meniscus lens, the tenth lens L10 included in the fifth lens group G5 is a biconcave lens, and the eleventh lens L11 included in the fifth lens group G5 is a positive meniscus lens.

Figure 7:
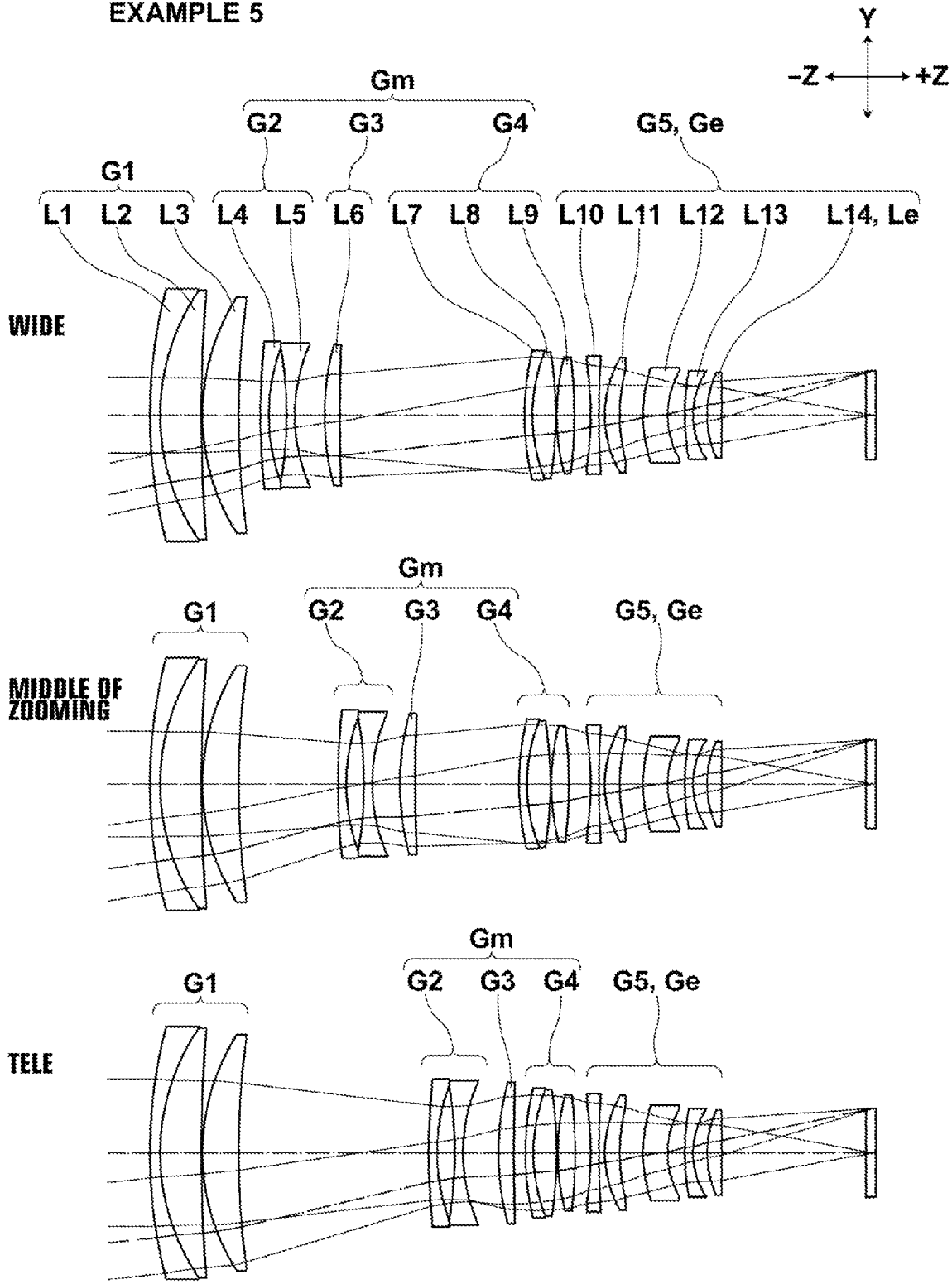
FIG. 7 shows cross-sectional views of a projection zoom lens of Example 5, illustrating lens arrangements at the wide angle end, in the middle of zooming, and at the telephoto end respectively.

The projection zoom lens of Example 5 is configured as illustrated in FIG. 7 which is similar to that of Example 1 but differs in that the tenth lens L10 included in the fifth lens group G5 is a biconcave lens, the eleventh lens L11 included in the fifth lens group G5 is a positive meniscus lens, and the fourteenth lens L14 included in the fifth lens group G5 is a biconcave lens.

Figure 8:
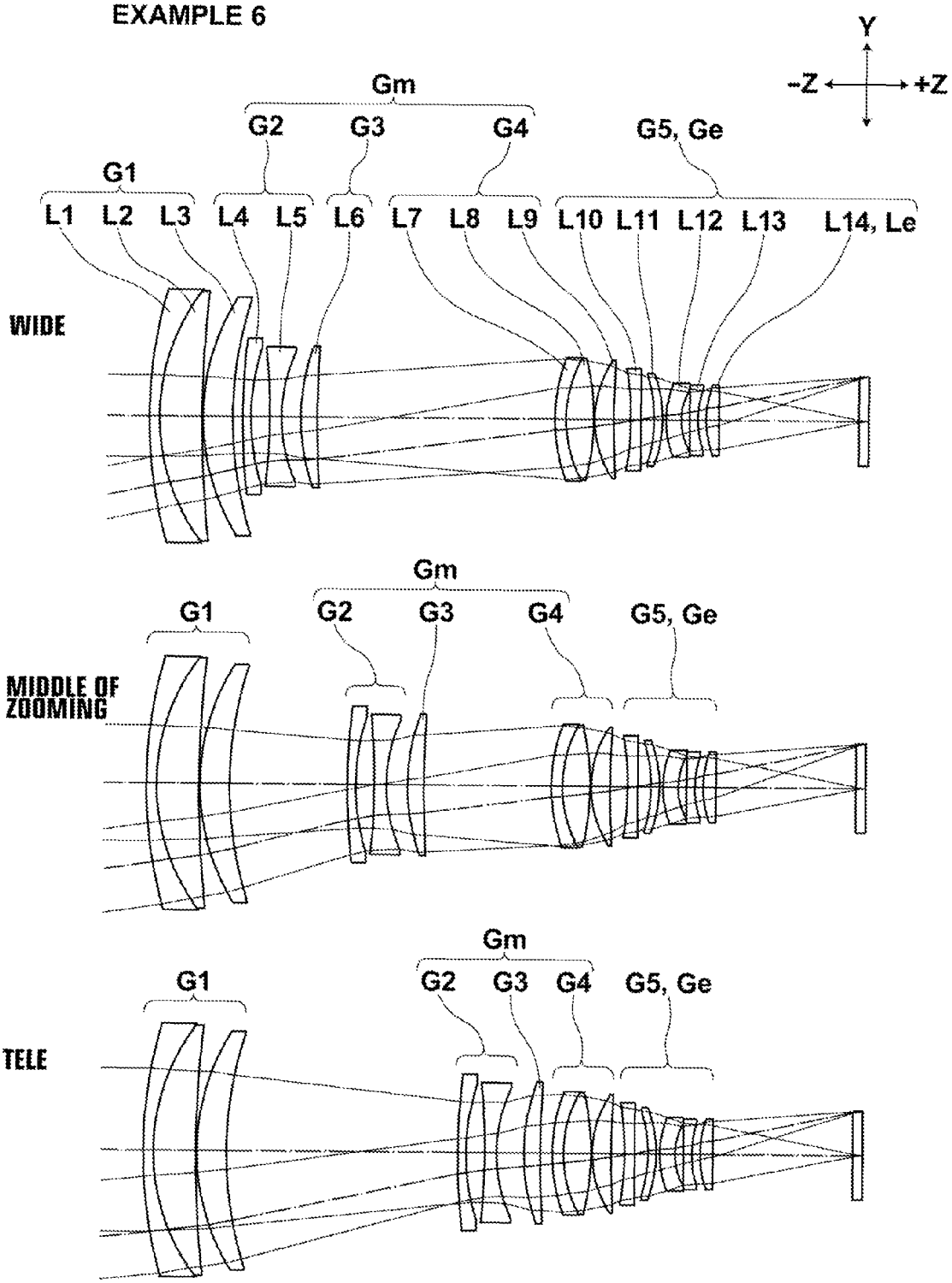
FIG. 8 shows cross-sectional views of a projection zoom lens of Example 6, illustrating lens arrangements at the wide angle end, in the middle of zooming, and at the telephoto end respectively.

The projection zoom lens of Example 6 is configured as illustrated in FIG. 8 which is similar to that of Example 1 but differs in that the ninth lens L9 included in the fourth lens group G4 is a positive meniscus lens, the tenth lens L10 included in the fifth lens group G5 is a biconcave lens, the eleventh lens L11 included in the fifth lens group G5 is a positive meniscus lens, and the fourteenth lens L14 included in the fifth lens group G5 is a biconvex lens.

Figure 9:
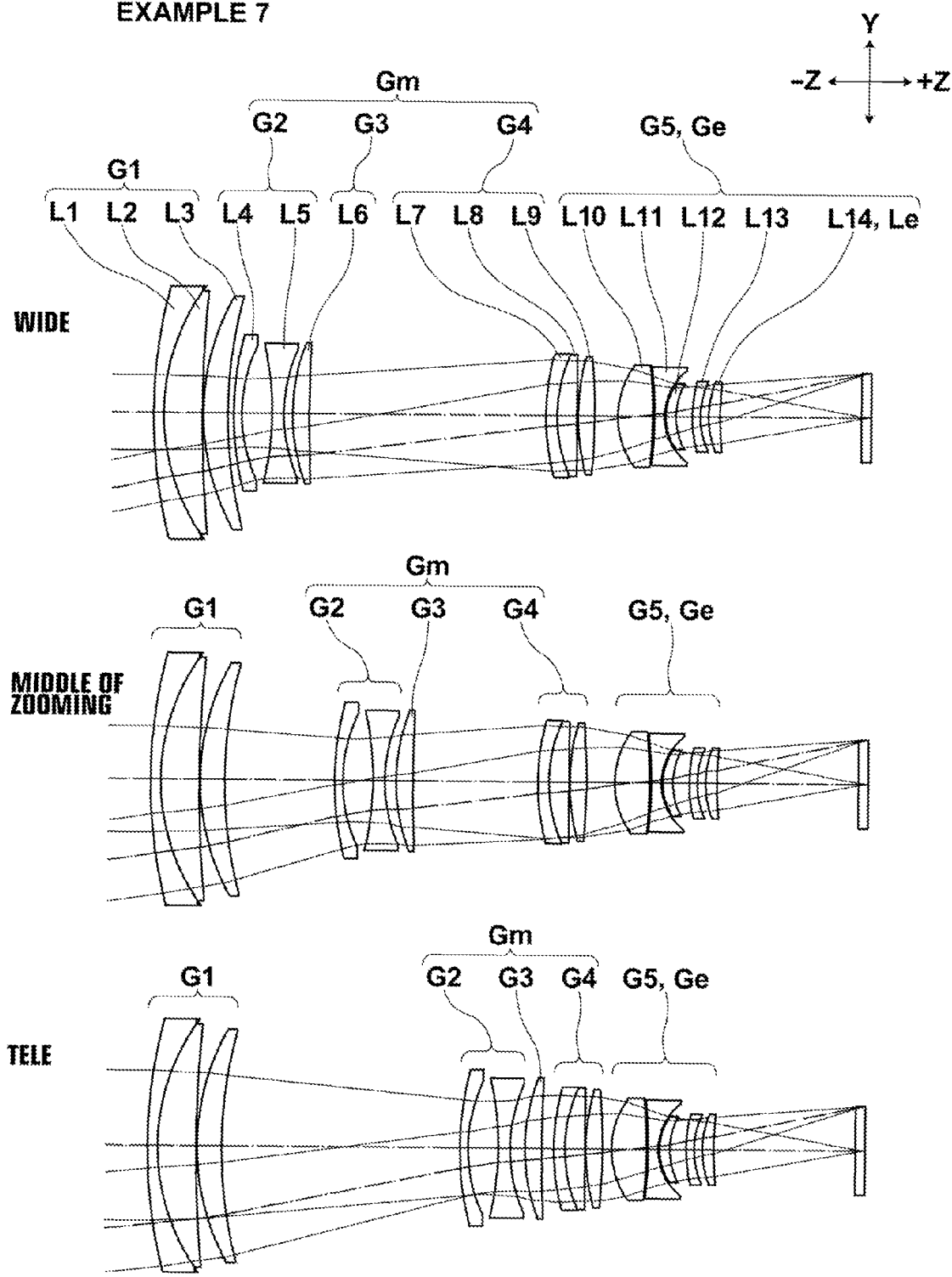
FIG. 9 shows cross-sectional views of a projection zoom lens of Example 7, illustrating lens arrangements at the wide angle end, in the middle of zooming, and at the telephoto end respectively.

The projection zoom lens of Example 7 is configured as illustrated in FIG. 9 which is similar to that of Example 1 but differs in that the eighth lens L8 included in the fourth lens group G4 is a positive meniscus lens, the tenth lens L10 included in the fifth lens group G5 is a biconvex lens, the eleventh lens L11 included in the fifth lens group G5 is a biconcave lens, the twelfth lens L12 included in the fifth lens group G5 is a positive meniscus lens, and the fourteenth lens L14 included in the fifth lens group G5 is a positive meniscus lens.

Figure 10:
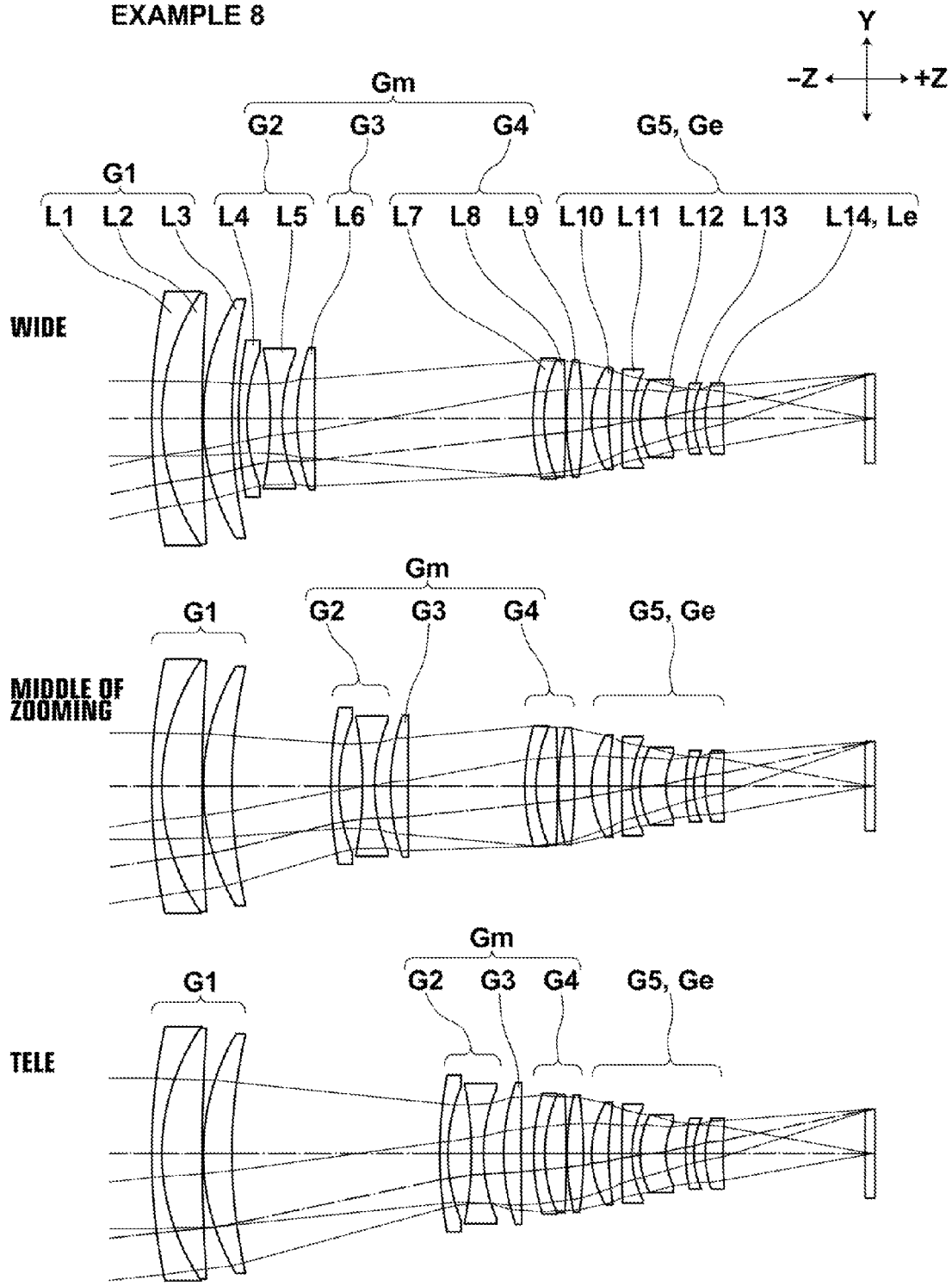
FIG. 10 shows cross-sectional views of a projection zoom lens of Example 8, illustrating lens arrangements at the wide angle end, in the middle of zooming, and at the telephoto end respectively.
Figure 11:
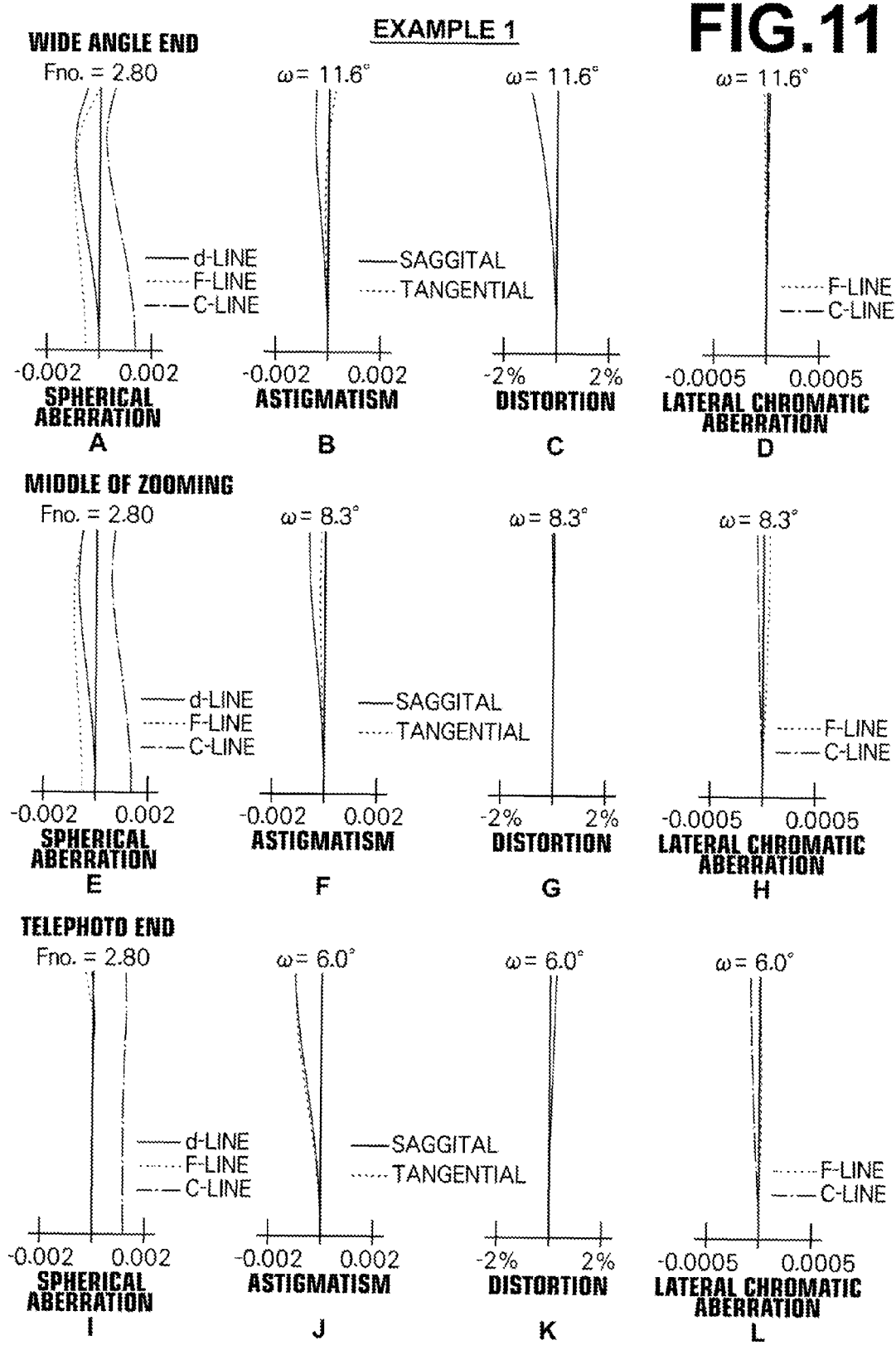
FIG. 11 illustrates various types of aberrations of the projection zoom lens of Example 1.
Figure 17:
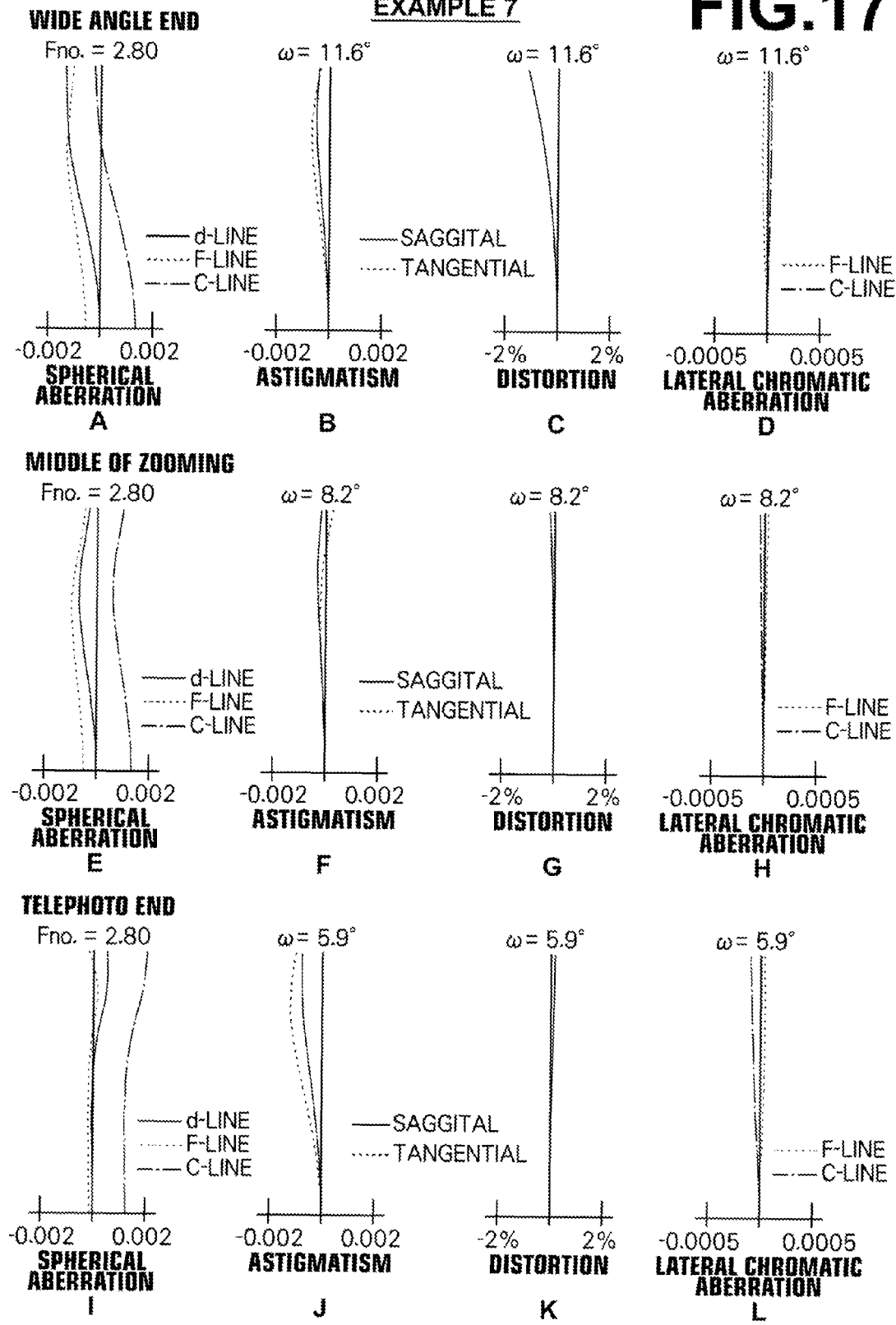
FIG. 17 illustrates various types of aberrations of the projection zoom lens of Example 7.
Figure 18:
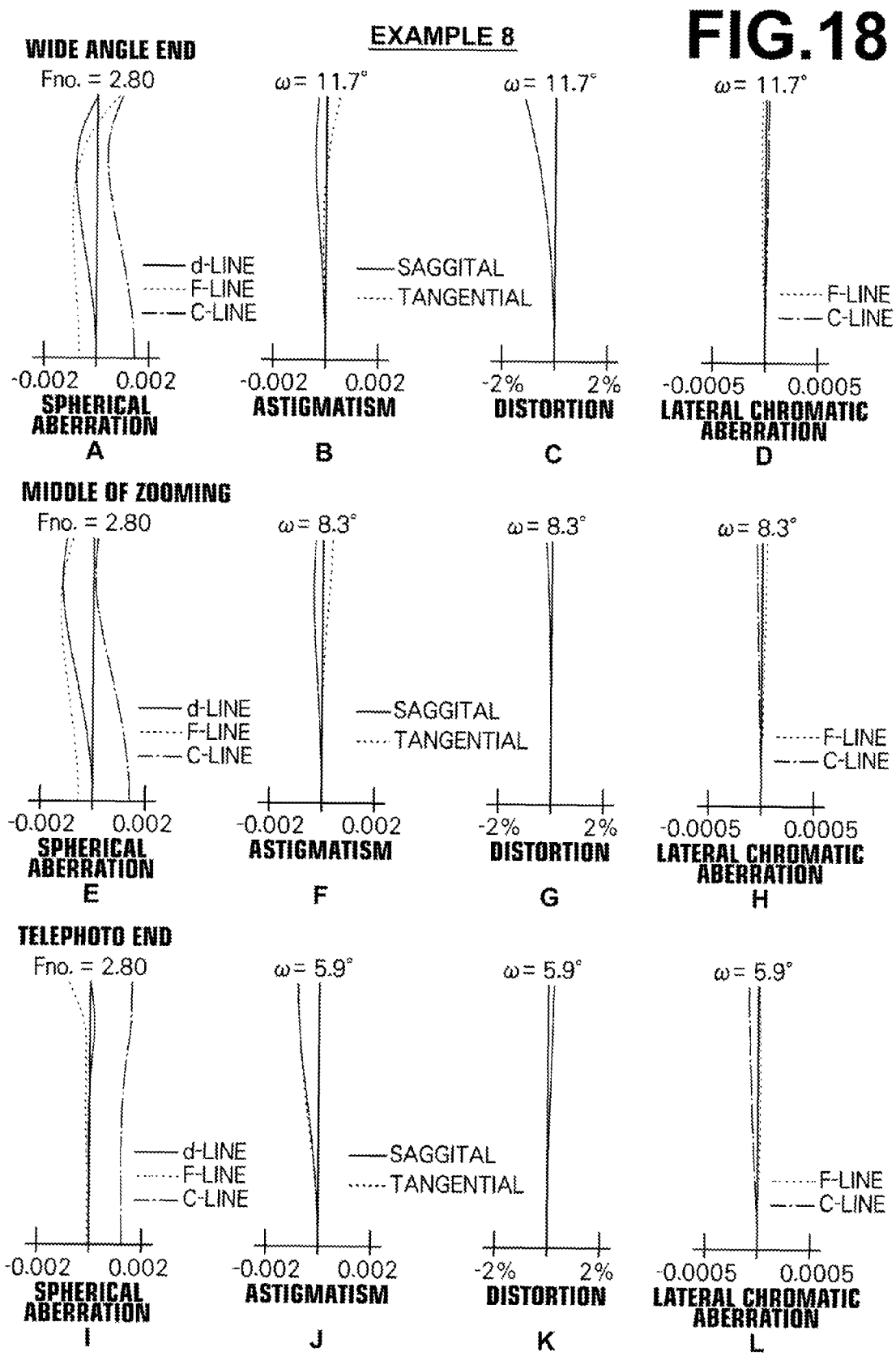
FIG. 18 illustrates various types of aberrations of the projection zoom lens of Example 8.

The projection zoom lens of Example 8 is configured as illustrated in FIG. 10 which is similar to that of Example 1 but differs t in that the fourteenth lens L14 included in the fifth lens group G5 is a positive meniscus lens.

FIGS. 11 to 18 show various types of aberrations of zoom lenses of Examples 1 to 8 respectively, each illustrating spherical aberrations, astigmatisms, distortions, and lateral chromatic aberrations at the wide angle end, in the middle of zooming, and at the telephoto end in this order. Each aberration diagram illustrates an aberration with d-line (wavelength of 587.6 nm) as the reference wavelength, but aberrations with respect to C-line (wavelength of 656.3 nm) and F-line (wavelength of 486.1 nm) are also illustrated in each spherical aberration diagram and lateral chromatic aberration diagram. Fno in spherical aberration diagrams represents F-number, and ω in other aberration diagrams represents half angle of view.

Note that aberration diagrams of FIGS. 11 to 18 illustrate aberrations when the reduction ratio of zoom lenses of Examples 1 to 8 is −1/145. Here, the focusing is performed by moving the first lens group G1 along the optical axis.

The aberration diagrams corresponding to the symbols A to D in each of FIGS. 11 to 18 illustrate aberrations at the wide angle end, in which A is spherical aberration, B is astigmatism, C is distortion, and D is lateral chromatic aberration.

The aberration diagrams corresponding to the symbols E to H in each drawing illustrate aberrations in the middle of zooming, in which E is spherical aberration, F is astigmatism, G is distortion, and H is lateral chromatic aberration.

The aberration diagrams corresponding to the symbols I to L in each drawing illustrate aberrations at the telephoto end, in which I is spherical aberration, J is astigmatism, K is distortion, and L is lateral chromatic aberration.

Tables 1 to 8 illustrate basic data of the zoom lenses of Examples 1 to 8.

In each of Tables 1 to 8, lens data are shown on the upper section (indicated by the symbol (a)).

The radius of curvature Ri represents the radius of curvature of $i^{th}$ (i=1, 2, 3, . . . ) surface from the magnification side and the surface distance Di (i=1, 2, 3, . . . ) represents the surface distance between $i^{th}$ surface and $(i+1)^{th}$ surface on the optical axis Z1. The symbols Ri and Di in the lens data correspond to the symbol Si (i=1, 2, 3, . . . ) representing the lens surface or the like.

The sign of a radius of curvature of a lens is positive if it is convex to the magnification side and negative if it is convex to the reduction side.

Each radius of curvature Ri described above is normalized with the focal length of the overall lens system at the wide angle end being taken as 1.

Note that a numerical value or "variable n (n is a numerical value)" appears in the column of the surface distance Di (i=1, 2, 3, . . . ) and position where the "variable n" appears varies at the time of zooming.

Each of the surface distance Di is normalized with the focal length of the overall lens system at the wide angle end being taken as 1, as in each radius of curvature Ri.

Ndj represents the refractive index of $j^{th}$ (j=1, 2, 3, . . . ) optical member of lens or cover glass, in which j increases sequentially from the magnification side toward the reduction side, with respect to the wavelength of 587.6 nm (d-line), while vdj represents the Abbe number of $j^{th}$ optical member with reference to the d-line.

Focal lengths of the overall lens system and distances between each of lens groups at the wide angle end, in the middle of zooming, and telephoto end are provided in the center of each of Tables 1 to 8 (indicated by the symbol (b)).

The "variable 1", "variable 2", "variable 3", and "variable 4" in each of Tables 1 to 8 represent distances between the first and second lens groups, between the second and third lens groups, between the third and fourth lens groups, and between the fourth and fifth lens groups respectively.

Further, the maximum image height (Ymax) on the reduction side, back focus (Bf), and distance from the pupil position on the reduction side to the image forming position on the reduction side at the wide angle end (EP) are provided on the lower side of each of Tables 1 to 8 (indicated by the symbol (c)).

Table 9 provides values corresponding to the conditional expressions (1) to (4).

Table 9 also provides upper and lower limit values of the conditional expressions (1) to (4), and upper and lower limit values of the more preferable conditional expressions (1A) to (4A).

Note that each of the zoom lenses of Examples 1 to 8 simultaneously satisfies all of the conditional expressions (1) to (4) and all of the more preferable conditional expressions (1A) to (4A).

Note that Tables 1 to 8 will be collectively provided at the end of this section, the "Best Mode for Carrying out the Invention".

As is known from the numerical data, aberration diagrams, and the like of Examples 1 to 8, the projection zoom lens and projection apparatus using the same according to the present invention are those having a high zoom ration with high brightness over the entire zoom range in which downsizing of the overall zoom lens is considered and aberrations are satisfactorily corrected.

It should be understood that the present invention is not limited to each of aforementioned Examples, and various changes and modifications may be made without departing from the spirit of the invention. For example, values of radius of curvature of each lens, surface distance, refractive index, and the like are not limited to those shown in each table and may take other values.

TABLE 1

(a)
Lens Data of Example 1

| Si (Sur. No.) | Ri (R of Cur.) | Di (.C. Thick) | Ndj (Ref. Index) | ν dj (Abbe No.) |
|---|---|---|---|---|
| 1 | 3.1672 | 0.0483 | 1.80610 | 40.9 |
| 2 | 1.1580 | 0.1835 | 1.60311 | 60.6 |
| 3 | 9.1711 | 0.0047 | | |
| 4 | 1.2095 | 0.1680 | 1.48749 | 70.2 |
| 5 | 3.1021 | Variable 1 | | |
| 6 | 26.8017 | 0.0389 | 1.74320 | 49.3 |
| 7 | 1.0484 | 0.0652 | | |
| 8 | −10.9389 | 0.0561 | 1.56732 | 42.8 |
| 9 | 0.8682 | Variable 2 | | |
| 10 | 1.0919 | 0.0844 | 1.75520 | 27.5 |
| 11 | 8.4388 | Variable 3 | | |
| 12 | 1.1362 | 0.0525 | 1.72825 | 28.5 |
| 13 | 0.8125 | 0.0908 | 1.48749 | 70.2 |
| 14 | −4.3691 | 0.0047 | | |
| 15 | 2.1082 | 0.0634 | 1.48749 | 70.2 |
| 16 | −2.5546 | Variable 4 | | |
| 17 | 0.5143 | 0.0803 | 1.48749 | 70.2 |
| 18 | 1.6467 | 0.0331 | | |
| 19 | 6.2902 | 0.0701 | 1.72000 | 50.2 |
| 20 | 1.0603 | 0.0138 | | |
| 21 | 0.3937 | 0.1184 | 1.69895 | 30.1 |
| 22 | 0.2937 | 0.0716 | | |
| 23 | 1.3748 | 0.0389 | 1.80518 | 25.4 |
| 24 | 0.4877 | 0.1265 | | |
| 25 | 0.7071 | 0.0701 | 1.71300 | 53.9 |
| 26 | ∞ | 0.6821 | | |
| 27 | ∞ | 0.0467 | 1.50847 | 61.2 |
| 28 | ∞ | | | |

(b)
Zoom Data of Example 1

| | F. Length | Variable 1 | Variable 2 | Variable 3 | Variable 4 |
|---|---|---|---|---|---|
| Wide | 1.000 | 0.0592 | 0.0941 | 1.0453 | 0.0435 |
| Middle | 1.395 | 0.5055 | 0.0973 | 0.5462 | 0.0931 |
| Tele | 1.945 | 1.0764 | 0.1201 | 0.0227 | 0.0228 |

(c)
C. Values of Example 1

| Ymax | 0.210 |
|---|---|
| Bf | 0.7130 |
| EP | 0.987 |

TABLE 2

(a)
Lens Data of Example 2

| Si (Sur. No.) | Ri (R of Cur.) | Di (.C. Thick) | Ndj (Ref. Index) | ν dj (Abbe No.) |
|---|---|---|---|---|
| 1 | 3.2915 | 0.0484 | 1.80610 | 40.9 |
| 2 | 1.1852 | 0.1835 | 1.60311 | 60.6 |
| 3 | 10.5724 | 0.0047 | | |
| 4 | 1.2392 | 0.1306 | 1.48749 | 70.2 |
| 5 | 3.0077 | Variable 1 | | |
| 6 | 16.0064 | 0.0390 | 1.74330 | 49.2 |
| 7 | 1.0817 | 0.0661 | | |
| 8 | −12.6567 | 0.0562 | 1.56732 | 42.8 |
| 9 | 0.8777 | Variable 2 | | |
| 10 | 1.1065 | 0.0856 | 1.75520 | 27.5 |
| 11 | 7.7222 | Variable 3 | | |
| 12 | 1.0770 | 0.0526 | 1.72825 | 28.5 |
| 13 | 0.8462 | 0.0947 | 1.48749 | 70.2 |
| 14 | −2.8719 | 0.0047 | | |

TABLE 2-continued

| | | | | |
|---|---|---|---|---|
| 15 | 1.3856 | 0.0658 | 1.48749 | 70.2 |
| 16 | −5.0391 | Variable 4 | | |
| 17 | 0.4421 | 0.0804 | 1.48749 | 70.2 |
| 18 | 1.0312 | 0.0261 | | |
| 19 | 3.4903 | 0.0546 | 1.71300 | 53.9 |
| 20 | 0.9868 | 0.0283 | | |
| 21 | 0.5176 | 0.1185 | 1.69895 | 30.1 |
| 22 | 0.2992 | 0.0681 | | |
| 23 | 2.2783 | 0.0390 | 1.80518 | 25.4 |
| 24 | 0.7238 | 0.1381 | | |
| 25 | 0.7811 | 0.0702 | 1.71300 | 53.9 |
| 26 | −48.5974 | 0.6797 | | |
| 27 | ∞ | 0.0468 | 1.50847 | 61.2 |
| 28 | ∞ | | | |

(b)
Zoom Data of Example 2

| | F. Length | Variable 1 | Variable 2 | Variable 3 | Variable 4 |
|---|---|---|---|---|---|
| Wide | 1.000 | 0.0592 | 0.0957 | 1.0965 | 0.0231 |
| Middle | 1.395 | 0.5466 | 0.0984 | 0.5739 | 0.0557 |
| Tele | 1.945 | 1.1071 | 0.1218 | 0.0227 | 0.0229 |

(c)
C. Values of Example 2

| | |
|---|---|
| Ymax | 0.211 |
| Bf | 0.7107 |
| EP | 0.988 |

TABLE 3

(a)
Lens Data of Example 3

| Si (Sur. No.) | Ri (R of Cur.) | Di (.C. Thick) | Ndj (Ref. Index) | ν dj (Abbe No.) |
|---|---|---|---|---|
| 1 | 2.1105 | 0.0480 | 1.80610 | 40.9 |
| 2 | 1.0310 | 0.1920 | 1.48749 | 70.2 |
| 3 | 5.3884 | 0.0047 | | |
| 4 | 1.0437 | 0.1707 | 1.48749 | 70.2 |
| 5 | 3.9438 | Variable 1 | | |
| 6 | 3.3063 | 0.0387 | 1.71300 | 53.9 |
| 7 | 0.8851 | 0.0896 | | |
| 8 | −1.7294 | 0.0387 | 1.56732 | 42.8 |
| 9 | 0.8397 | Variable 2 | | |
| 10 | 1.2683 | 0.0747 | 1.80518 | 25.4 |
| 11 | 11.6863 | Variable 3 | | |
| 12 | 1.1066 | 0.0372 | 1.69895 | 30.1 |
| 13 | 0.7308 | 0.1374 | 1.48749 | 70.2 |
| 14 | −1.1791 | 0.0047 | | |
| 15 | 1.2652 | 0.0572 | 1.48749 | 70.2 |
| 16 | 9.4136 | Variable 4 | | |
| 17 | −1.3734 | 0.0387 | 1.74320 | 49.3 |
| 18 | −5.1033 | 0.0142 | | |
| 19 | 0.5858 | 0.0697 | 1.71300 | 53.9 |
| 20 | 1.1146 | 0.1195 | | |
| 21 | 0.6654 | 0.1178 | 1.69895 | 30.1 |
| 22 | 0.3994 | 0.0865 | | |
| 23 | 1.8913 | 0.0387 | 1.64769 | 33.8 |
| 24 | 0.3963 | 0.0647 | | |
| 25 | 0.5123 | 0.0697 | 1.60311 | 60.6 |
| 26 | −4.2626 | 0.6789 | | |
| 27 | ∞ | 0.0465 | 1.50847 | 61.2 |
| 28 | ∞ | | | |

(b)
Zoom Data of Example 3

| | F. Length | Variable 1 | Variable 2 | Variable 3 | Variable 4 |
|---|---|---|---|---|---|
| Wide | 1.000 | 0.1125 | 0.1318 | 0.8351 | 0.1063 |
| Middle | 1.395 | 0.4509 | 0.1296 | 0.4529 | 0.1522 |
| Tele | 1.945 | 0.8811 | 0.1577 | 0.0444 | 0.1024 |

(c)
C. Values of Example 3

| | |
|---|---|
| Ymax | 0.209 |
| Bf | 0.7097 |
| EP | 0.981 |

TABLE 4

(a)
Lens Data of Example 4

| Si (Sur. No.) | Ri (R of Cur.) | Di (.C. Thick) | Ndj (Ref. Index) | ν dj (Abbe No.) |
|---|---|---|---|---|
| 1 | 1.9385 | 0.0483 | 1.80610 | 33.3 |
| 2 | 1.1323 | 0.1835 | 1.60311 | 60.6 |
| 3 | 4.8205 | 0.0047 | | |
| 4 | 1.2145 | 0.1453 | 1.48749 | 70.2 |
| 5 | 1.9996 | Variable 1 | | |
| 6 | 3.0386 | 0.0390 | 1.77250 | 49.6 |
| 7 | 0.9617 | 0.1722 | | |
| 8 | −2.0820 | 0.0561 | 1.57501 | 41.5 |
| 9 | 0.7942 | Variable 2 | | |
| 10 | 1.0221 | 0.0876 | 1.76182 | 26.5 |
| 11 | 15.4664 | Variable 3 | | |
| 12 | 0.9423 | 0.0390 | 1.72825 | 28.5 |
| 13 | 0.6852 | 0.1188 | 1.48749 | 70.2 |
| 14 | −1.2850 | 0.0047 | | |
| 15 | 0.7333 | 0.0647 | 1.48749 | 70.2 |
| 16 | 2.6342 | Variable 4 | | |
| 17 | −1.8073 | 0.0312 | 1.56384 | 60.7 |
| 18 | 2.0170 | 0.0047 | | |
| 19 | 0.4473 | 0.0526 | 1.71300 | 53.9 |
| 20 | 0.8778 | 0.0211 | | |
| 21 | 0.7493 | 0.0902 | 1.69895 | 30.1 |
| 22 | 0.3174 | 0.0347 | | |
| 23 | 1.3624 | 0.0312 | 1.56732 | 42.8 |
| 24 | 0.4009 | 0.0430 | | |
| 25 | 0.4492 | 0.0583 | 1.62299 | 58.2 |
| 26 | ∞ | 0.6826 | | |
| 27 | ∞ | 0.0468 | 1.50847 | 61.2 |
| 28 | ∞ | | | |

(b)
Zoom Data of Example 4

| | F. Length | Variable 1 | Variable 2 | Variable 3 | Variable 4 |
|---|---|---|---|---|---|
| Wide | 1.000 | 0.0645 | 0.0693 | 0.9785 | 0.1078 |
| Middle | 1.414 | 0.5151 | 0.0762 | 0.5059 | 0.1228 |
| Tele | 2.000 | 1.0075 | 0.0954 | 0.0227 | 0.0945 |

(c)
C. Values of Example 4

| | |
|---|---|
| Ymax | 0.210 |
| Bf | 0.7136 |
| EP | 0.987 |

TABLE 5

(a)
Lens Data of Example 5

| Si (Sur. No.) | Ri (R of Cur.) | Di (.C. Thick) | Ndj (Ref. Index) | ν dj (Abbe No.) |
|---|---|---|---|---|
| 1 | 2.3714 | 0.0480 | 1.79952 | 42.2 |
| 2 | 1.0455 | 0.1943 | 1.48749 | 70.2 |
| 3 | 7.5650 | 0.0047 | | |
| 4 | 1.0412 | 0.1705 | 1.48749 | 70.2 |
| 5 | 4.0103 | Variable 1 | | |
| 6 | 3.3740 | 0.0387 | 1.71300 | 53.9 |
| 7 | 0.9180 | 0.0839 | | |

TABLE 5-continued

| | | | | |
|---|---|---|---|---|
| 8 | −1.8835 | 0.1705 | 1.56732 | 42.8 |
| 9 | 0.8325 | Variable 2 | | |
| 10 | 1.2598 | 0.0725 | 1.80518 | 25.4 |
| 11 | 9.0598 | Variable 3 | | |
| 12 | 1.2984 | 0.0372 | 1.72825 | 28.5 |
| 13 | 0.8097 | 0.1103 | 1.58913 | 61.1 |
| 14 | −1.9221 | 0.0047 | | |
| 15 | 1.1065 | 0.0825 | 1.48749 | 70.2 |
| 16 | −2.3280 | Variable 4 | | |
| 17 | −1.5998 | 0.0387 | 1.74320 | 49.3 |
| 18 | 4.4372 | 0.0281 | | |
| 19 | 0.5498 | 0.0697 | 1.71300 | 53.9 |
| 20 | 0.8593 | 0.1107 | | |
| 21 | 0.7236 | 0.1151 | 1.69895 | 30.1 |
| 22 | 0.4198 | 0.0814 | | |
| 23 | 1.2194 | 0.0387 | 1.64769 | 33.8 |
| 24 | 0.3789 | 0.0661 | | |
| 25 | 0.4914 | 0.0698 | 1.60311 | 60.6 |
| 26 | −11.1443 | 0.6788 | | |
| 27 | ∞ | 0.0465 | 1.50847 | 61.2 |
| 28 | ∞ | | | |

(b)
Zoom Data of Example 5

| | F. Length | Variable 1 | Variable 2 | Variable 3 | Variable 4 |
|---|---|---|---|---|---|
| Wide | 1.000 | 0.1035 | 0.1402 | 0.8702 | 0.0778 |
| Middle | 1.395 | 0.4691 | 0.1303 | 0.4889 | 0.1034 |
| Tele | 1.945 | 0.8970 | 0.1661 | 0.0550 | 0.0736 |

(c)
C. Values of Example 5

| | |
|---|---|
| Ymax | 0.209 |
| Bf | 0.7096 |
| EP | 0.982 |

TABLE 6

(a)
Lens Data of Example 6

| Si (Sur. No.) | Ri (R of Cur.) | Di (.C. Thick) | Ndj (Ref. Index) | ν dj (Abbe No.) |
|---|---|---|---|---|
| 1 | 2.1667 | 0.0484 | 1.80440 | 39.6 |
| 2 | 0.9901 | 0.2014 | 1.62299 | 58.2 |
| 3 | 5.3427 | 0.0047 | | |
| 4 | 1.0698 | 0.1400 | 1.48749 | 70.2 |
| 5 | 1.8177 | Variable 1 | | |
| 6 | 3.1758 | 0.0390 | 1.74320 | 49.3 |
| 7 | 1.0562 | 0.0885 | | |
| 8 | −3.2217 | 0.0562 | 1.56732 | 42.8 |
| 9 | 0.7381 | Variable 2 | | |
| 10 | 0.9637 | 0.0779 | 1.75520 | 27.5 |
| 11 | 5.0182 | Variable 3 | | |
| 12 | 0.8226 | 0.0526 | 1.72825 | 28.5 |
| 13 | 0.6002 | 0.1314 | 1.48749 | 70.2 |
| 14 | −1.1992 | 0.0047 | | |
| 15 | 0.5072 | 0.0898 | 1.48749 | 70.2 |
| 16 | 4.0537 | Variable 4 | | |
| 17 | −1.4134 | 0.0468 | 1.80400 | 46.6 |
| 18 | 25.3845 | 0.0638 | | |
| 19 | −0.6841 | 0.0390 | 1.60342 | 38.0 |
| 20 | −0.6219 | 0.0173 | | |
| 21 | 0.4732 | 0.0717 | 1.80518 | 25.4 |
| 22 | 0.2980 | 0.0396 | | |
| 23 | 8.9972 | 0.0390 | 1.65844 | 50.9 |
| 24 | 0.4593 | 0.0396 | | |
| 25 | 0.4860 | 0.0605 | 1.71300 | 53.9 |
| 26 | −709196.4 | 0.6627 | | |
| 27 | ∞ | 0.0468 | 1.50847 | 61.2 |
| 28 | ∞ | | | |

TABLE 6-continued (b)
Zoom Data of Example 6

| | F. Length | Variable 1 | Variable 2 | Variable 3 | Variable 4 |
|---|---|---|---|---|---|
| Wide | 1.000 | 0.0475 | 0.0915 | 1.1259 | 0.0812 |
| Middle | 1.414 | 0.5584 | 0.1009 | 0.6033 | 0.0836 |
| Tele | 2.000 | 1.0962 | 0.1290 | 0.0572 | 0.0638 |

(c)
C. Values of Example 6

| | |
|---|---|
| Ymax | 0.211 |
| Bf | 0.6938 |
| EP | 0.989 |

TABLE 7

(a)
Lens Data of Example 7

| Si (Sur. No.) | Ri (R of Cur.) | Di (.C. Thick) | Ndj (Ref. Index) | ν dj (Abbe No.) |
|---|---|---|---|---|
| 1 | 2.3792 | 0.0484 | 1.80440 | 39.6 |
| 2 | 1.0203 | 0.1827 | 1.62299 | 58.2 |
| 3 | 6.1650 | 0.0047 | | |
| 4 | 1.1435 | 0.1159 | 1.48749 | 70.2 |
| 5 | 2.1180 | Variable 1 | | |
| 6 | 1.4478 | 0.0391 | 1.74320 | 49.3 |
| 7 | 0.7520 | 0.1433 | | |
| 8 | −1.4335 | 0.0562 | 1.51742 | 52.4 |
| 9 | 0.7584 | Variable 2 | | |
| 10 | 0.9265 | 0.0796 | 1.80610 | 33.3 |
| 11 | 6.9536 | Variable 3 | | |
| 12 | 1.1093 | 0.0526 | 1.75520 | 27.5 |
| 13 | 0.7075 | 0.0945 | 1.48749 | 70.2 |
| 14 | 25.9775 | 0.0047 | | |
| 15 | 1.0443 | 0.0793 | 1.48749 | 70.2 |
| 16 | −3.2331 | Variable 4 | | |
| 17 | 0.4149 | 0.1661 | 1.62230 | 53.2 |
| 18 | −2.1966 | 0.0079 | | |
| 19 | −2.0308 | 0.0469 | 1.74320 | 49.3 |
| 20 | 0.2798 | 0.0065 | | |
| 21 | 0.2770 | 0.0483 | 1.48749 | 70.2 |
| 22 | 0.3257 | 0.0778 | | |
| 23 | 0.6568 | 0.0379 | 1.76182 | 26.5 |
| 24 | 0.3982 | 0.0394 | | |
| 25 | 0.4535 | 0.0539 | 1.71300 | 53.9 |
| 26 | 1.4398 | 0.6712 | | |
| 27 | ∞ | 0.0469 | 1.50847 | 61.2 |
| 28 | ∞ | | | |

(b)
Zoom Data of Example 7

| | F. Length | Variable 1 | Variable 2 | Variable 3 | Variable 4 |
|---|---|---|---|---|---|
| Wide | 1.000 | 0.0282 | 0.0407 | 1.1234 | 0.1101 |
| Middle | 1.414 | 0.5219 | 0.0534 | 0.5932 | 0.1339 |
| Tele | 2.000 | 1.1317 | 0.0705 | 0.0568 | 0.0434 |

(c)
C. Values of Example 7

| | |
|---|---|
| Ymax | 0.211 |
| Bf | 0.7022 |
| EP | 0.989 |

TABLE 8

(a) Lens Data of Example 8

| Si (Sur. No.) | Ri (R of Cur.) | Di (.C. Thick) | Ndj (Ref. Index) | ν dj (Abbe No.) |
|---|---|---|---|---|
| 1 | 2.9136 | 0.0485 | 1.80440 | 39.6 |
| 2 | 1.0630 | 0.1910 | 1.62299 | 58.2 |
| 3 | 8.7926 | 0.0047 | | |
| 4 | 1.1189 | 0.1359 | 1.48749 | 70.2 |
| 5 | 2.5108 | Variable 1 | | |
| 6 | 1.9667 | 0.0391 | 1.74320 | 49.3 |
| 7 | 0.8441 | 0.1113 | | |
| 8 | −1.6758 | 0.0563 | 1.56732 | 42.8 |
| 9 | 0.7875 | Variable 2 | | |
| 10 | 1.0196 | 0.0833 | 1.75520 | 27.5 |
| 11 | 20.8192 | Variable 3 | | |
| 12 | 1.0169 | 0.0527 | 1.72825 | 28.5 |
| 13 | 0.6999 | 0.1016 | 1.48749 | 70.2 |
| 14 | −7.1886 | 0.0047 | | |
| 15 | 1.2725 | 0.0765 | 1.48749 | 70.2 |
| 16 | −2.2211 | Variable 4 | | |
| 17 | 0.4715 | 0.0807 | 1.48749 | 70.2 |
| 18 | 1.3951 | 0.0631 | | |
| 19 | 8.3030 | 0.0469 | 1.72000 | 50.2 |
| 20 | 0.4845 | 0.0383 | | |
| 21 | 0.3912 | 0.1215 | 1.74950 | 35.3 |
| 22 | 0.3292 | 0.0939 | | |
| 23 | 0.7339 | 0.0391 | 1.80518 | 25.4 |
| 24 | 0.4090 | 0.0541 | | |
| 25 | 0.4905 | 0.0853 | 1.71300 | 53.9 |
| 26 | 3.4295 | 0.6713 | | |
| 27 | ∞ | 0.0469 | 1.50847 | 61.2 |
| 28 | ∞ | | | |

(b) Zoom Data of Example 8

| | F. Length | Variable 1 | Variable 2 | Variable 3 | Variable 4 |
|---|---|---|---|---|---|
| Wide | 1.000 | 0.0313 | 0.0697 | 1.0325 | 0.0424 |
| Middle | 1.414 | 0.4681 | 0.0755 | 0.5525 | 0.0798 |
| Tele | 2.000 | 0.9827 | 0.0959 | 0.0585 | 0.0389 |

(c) C. Values of Example 8

| | |
|---|---|
| Ymax | 0.211 |
| Bf | 0.7024 |
| EP | 0.991 |

What is claimed is:

1. A projection zoom lens comprising:
a first lens group disposed on a most magnification side and having a positive power, the lens group being fixed at a time of zooming;
a final lens group disposed on a most reduction side and having a negative power, the lens group being fixed at the time of zooming; and
a plurality of lens groups disposed between the first and final lens groups and moved at the time of zooming along an optical axis in association with each other for the zooming and correction of image plane shift arising from the zooming, wherein:
the final lens group comprises a lens having a positive power on the most reduction side;
the plurality of lens groups moved at the time of zooming comprises a second lens group having a negative power, a third lens group having a positive power, and a fourth lens group having a positive power arranged in this order from the magnification side;
the second and third lens groups are moved from the magnification side to the reduction side when zooming is performed from the wide angle end to the telephoto end, and the fourth lens group is moved once to the magnification side and then to the reduction side when zooming is performed from the wide angle end to the telephoto end; and
a distance on an optical axis between the third lens group and the fourth lens group at the wide angle end is larger than a distance on an optical axis between the second lens group and the third lens group at the wide angle end.

2. The projection zoom lens of claim 1, wherein the projection zoom lens satisfies a conditional expression (1) given below:

$$3.0<Bf/Ymax<4.0 \quad (1),$$

where:
Bf is a back focus (air equivalent distance); and
Ymax is a maximum image height on the reduction side.

3. The projection zoom lens of claim 2, wherein the projection zoom lens satisfies a conditional expression (1A) given below:

$$3.2<Bf/Ymax<3.5 \quad (1A).$$

4. The projection zoom lens of claim 1, wherein the projection zoom lens satisfies a conditional expression (2) given below:

$$3.0<EP/Ymax<7.0 \quad (2),$$

TABLE 9

| Item | Formula/Symbol | Example 1 | Example 2 | Example 3 | Example 4 | Example 5 | Example 6 | Example 7 | Example 8 | Lower Limit of Cond. Exp. | Upper Limit of Cond. Exp. | Pref. Lower Limit of Cond. Exp. | Pref. Upper Limit of Cond. Exp. |
|---|---|---|---|---|---|---|---|---|---|---|---|---|---|
| Conditional Expression (1) | Bf/Ymax | 3.391 | 3.375 | 3.393 | 3.391 | 3.392 | 3.292 | 3.330 | 3.327 | 3.0 | 4.0 | 3.2 | 3.5 |
| Conditional Expression (2) | EP/Ymax | 4.692 | 4.692 | 4.692 | 4.692 | 4.692 | 4.692 | 4.692 | 4.692 | 3.0 | 7.0 | 4.0 | 5.5 |
| Conditional Expression (3) | f4/f | 1.168 | 1.018 | 0.943 | 0.799 | 0.772 | 0.601 | 1.139 | 0.992 | 0.1 | 2.0 | 0.4 | 1.5 |
| Conditional Expression (4) | (f45)/f | 1.035 | 1.054 | 0.982 | 1.002 | 0.990 | 0.994 | 0.982 | 0.999 | 0.5 | 1.5 | 0.8 | 1.2 | where:
- EP is a distance from a pupil position on the reduction side to an image forming position on the reduction side at the wide angle end; and
- Ymax is a maximum image height on the reduction side.

5. The projection zoom lens of claim 4, wherein the projection zoom lens satisfies a conditional expression (2A) given below:

$$4.0 < EP/Ymax < 5.5 \quad (2A).$$

6. The projection zoom lens of claim 1, wherein the pupil position on the reduction side at the wide angle end is further to the reduction side than a lens surface disposed on the most reduction side in the plurality of lens groups moved at the time of zooming.

7. The projection zoom lens of claim 1, wherein the projection zoom lens satisfies a conditional expression (3) given below:

$$0.1 < f4/f < 2.0 \quad (3),$$

where:
- f is a focal length of the overall lens system at the wide angle end; and
- f4 is a focal length of the fourth lens group.

8. The projection zoom lens of claim 7, wherein the projection zoom lens satisfies a conditional expression (3A) given below:

$$0.4 < f4/f < 1.5 \quad (3A).$$

9. The projection zoom lens of claim 1, wherein the projection zoom lens satisfies a conditional expression (4) given below:

$$0.5 < (f45)/f < 1.5 \quad (4),$$

where:
- f is a focal length of the overall lens system at the wide angle end; and
- f45 is a combined focal length of the fourth and final lens groups.

10. The projection zoom lens of claim 9, wherein the projection zoom lens satisfies a conditional expression (4A) given below:

$$0.8 < (f45)/f < 1.2 \quad (4A).$$

11. The projection zoom lens of claim 1, wherein focusing is performed by moving the first lens group in an optical axis direction.

12. The projection zoom lens of claim 1, wherein the projection zoom lens has an F-number which is constant over the entire range of the zooming.

13. The projection zoom lens of claim 1, wherein the final lens group does not include a cemented lens.

14. The projection zoom lens of claim 1, wherein the projection zoom lens has a zoom ratio of not less than 1.5.

15. The projection zoom lens of claim 1, wherein the projection zoom lens has a half angle of view of not greater than 15° on the magnification side at a maximum image height on the reduction side at the telephoto end.

16. The projection zoom lens of claim 1, wherein the projection zoom lens is composed of only spherical lenses.

17. A projection apparatus, comprising the projection zoom lens of claim 1, a light source, and a light valve for modulating a light flux emitted from the light source, wherein the light flux emitted from the light source and modulated by the light valve is projected through the projection zoom lens.

* * * * *